(12) United States Patent
Sugimoto

(10) Patent No.: US 10,507,888 B2
(45) Date of Patent: Dec. 17, 2019

(54) BICYCLE CRANK ASSEMBLY AND BICYCLE SPROCKET ASSEMBLY

(71) Applicant: SHIMANO INC., Sakai (JP)

(72) Inventor: Akinobu Sugimoto, Sakai (JP)

(73) Assignee: SHIMANO INC., Sakai (JP)

( * ) Notice: Subject to any disclaimer, the term of this patent is extended or adjusted under 35 U.S.C. 154(b) by 274 days.

(21) Appl. No.: 15/348,938

(22) Filed: Nov. 10, 2016

(65) Prior Publication Data

US 2018/0127057 A1 May 10, 2018

(51) Int. Cl.
  *B62M 9/10* (2006.01)
  *B62M 1/36* (2013.01)
  *F16H 55/30* (2006.01)
  *B62M 9/00* (2006.01)

(52) U.S. Cl.
  CPC ............. *B62M 9/105* (2013.01); *B62M 1/36* (2013.01); *F16H 55/30* (2013.01); *B62M 2009/007* (2013.01)

(58) Field of Classification Search
  CPC .......... B62M 9/10; B62M 9/105; B62M 9/12; F16H 55/30; Y10T 74/2165
  USPC ........................................................ 474/160
  See application file for complete search history.

(56) References Cited

U.S. PATENT DOCUMENTS

| | | | | |
|---|---|---|---|---|
| 590,649 A | * | 9/1897 | Ribyn, Jr. ................ | F16H 55/30 474/156 |
| 3,956,943 A | * | 5/1976 | Yamasaki ................. | B62M 9/10 474/148 |
| 3,969,947 A | * | 7/1976 | Martin ..................... | F16H 55/30 474/156 |
| 4,174,642 A | * | 11/1979 | Martin ..................... | F16H 55/30 474/152 |
| 4,598,608 A | * | 7/1986 | Ueno ...................... | B62M 9/105 474/160 |
| 4,889,521 A | * | 12/1989 | Nagano .................... | B62M 9/10 474/164 |
| 5,087,226 A | * | 2/1992 | Nagano .................... | B62M 9/10 474/160 |
| 5,192,248 A | * | 3/1993 | Nagano .................... | B62M 9/10 474/140 |
| 5,192,249 A | * | 3/1993 | Nagano .................... | B62M 9/10 474/160 |
| 5,413,534 A | * | 5/1995 | Nagano .................... | B62M 9/10 474/160 |
| 5,503,598 A | * | 4/1996 | Neuer ...................... | B62M 9/10 474/160 |
| 5,514,042 A | * | 5/1996 | Liou ........................ | B62M 9/10 474/160 |

(Continued)

*Primary Examiner* — Henry Y Liu
(74) *Attorney, Agent, or Firm* — Mori & Ward, LLP

(57) ABSTRACT

A bicycle crank assembly comprises a crank arm, a first sprocket, and a second sprocket. One of the first sprocket and the second sprocket comprises a first shifting facilitation area to facilitate a first shifting operation in which a bicycle chain is shifted from the second sprocket toward the first sprocket in a first chain-phase state in which a reference tooth of a plurality of second sprocket teeth is received in an outer link space, and a second shifting facilitation area to facilitate a second shifting operation in which the bicycle chain is shifted from the second sprocket toward the first sprocket in a second chain-phase state in which the reference tooth of the plurality of second sprocket teeth is received in an inner link space.

30 Claims, 27 Drawing Sheets

(56) References Cited

U.S. PATENT DOCUMENTS

| | | | | |
|---|---|---|---|---|
| 5,545,096 A * | 8/1996 | Su | B62M 9/10 | 474/160 |
| 5,609,536 A * | 3/1997 | Hsu | B62M 9/10 | 474/160 |
| 5,690,570 A * | 11/1997 | Chang | B62M 9/10 | 474/158 |
| 5,738,603 A * | 4/1998 | Schmidt | B62M 9/10 | 474/158 |
| 5,876,296 A * | 3/1999 | Hsu | B62M 9/10 | 474/140 |
| 5,935,033 A * | 8/1999 | Tseng | B62M 9/105 | 474/116 |
| 5,971,878 A * | 10/1999 | Leng | F16H 55/30 | 474/160 |
| 6,007,442 A * | 12/1999 | Schmidt | B62M 9/10 | 474/122 |
| 6,013,001 A * | 1/2000 | Miyoshi | B62M 9/10 | 474/156 |
| 6,045,472 A * | 4/2000 | Sung | B62M 9/10 | 474/158 |
| 6,139,456 A * | 10/2000 | Lii | B62M 9/10 | 474/152 |
| 6,203,462 B1 * | 3/2001 | Takamori | B62M 9/02 | 474/156 |
| 6,264,575 B1 * | 7/2001 | Lim | B62M 9/10 | 192/64 |
| 6,340,338 B1 * | 1/2002 | Kamada | B62M 9/10 | 474/152 |
| 6,666,786 B2 * | 12/2003 | Yahata | B62M 9/105 | 474/152 |
| 6,860,171 B1 * | 3/2005 | Nanko | B62M 3/003 | 474/160 |
| 7,883,437 B2 * | 2/2011 | Braedt | F16H 55/30 | 474/160 |
| 8,092,329 B2 * | 1/2012 | Wickliffe | B62M 9/105 | 474/160 |
| 8,617,015 B2 * | 12/2013 | Wickliffe | F16H 55/30 | 474/160 |
| 8,882,619 B2 * | 11/2014 | Braedt | F16H 7/06 | 474/156 |
| 9,316,302 B2 * | 4/2016 | Braedt | F16H 55/30 | |
| 9,328,814 B2 * | 5/2016 | Wesling | F16H 55/06 | |
| 9,334,014 B2 * | 5/2016 | Fukunaga | B62M 9/10 | |
| 9,463,844 B2 * | 10/2016 | Fukunaga | B62M 9/10 | |
| 9,540,070 B2 * | 1/2017 | Watarai | B62M 9/02 | |
| 9,873,481 B2 * | 1/2018 | Braedt | B62M 9/10 | |
| 2002/0098934 A1 * | 7/2002 | Wigsten | F16G 13/04 | 474/212 |
| 2003/0073530 A1 * | 4/2003 | Mao | B62M 9/10 | 474/160 |
| 2004/0009838 A1 * | 1/2004 | Valle | B62M 9/105 | 474/160 |
| 2004/0043855 A1 * | 3/2004 | Wei | B62M 9/10 | 474/160 |
| 2005/0079940 A1 * | 4/2005 | Reiter | B62M 9/10 | 474/160 |
| 2005/0282671 A1 * | 12/2005 | Emura | B62M 9/06 | 474/160 |
| 2006/0128511 A1 * | 6/2006 | Oishi | B62M 9/10 | 474/160 |
| 2006/0154767 A1 * | 7/2006 | Kamada | B62M 9/10 | 474/160 |
| 2007/0054768 A1 * | 3/2007 | Miyazawa | F16H 55/30 | 474/152 |
| 2007/0060428 A1 * | 3/2007 | Meggiolan | B62M 9/10 | 474/160 |
| 2009/0098966 A1 * | 4/2009 | Kamada | B62M 9/10 | 474/160 |
| 2011/0092327 A1 * | 4/2011 | Oishi | B62M 9/10 | 474/160 |
| 2013/0139642 A1 * | 6/2013 | Reiter | B62M 9/105 | 74/594.2 |
| 2013/0184110 A1 * | 7/2013 | Reiter | F16H 55/303 | 474/152 |
| 2014/0338494 A1 * | 11/2014 | Sugimoto | B62M 1/36 | 74/594.2 |
| 2016/0101825 A1 * | 4/2016 | Braedt | B62M 9/12 | 474/160 |

* cited by examiner

BICYCLE CRANK ASSEMBLY AND BICYCLE SPROCKET ASSEMBLY

BACKGROUND OF THE INVENTION

Field of the Invention

The present invention relates to a bicycle crank assembly and a bicycle sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle crank assembly comprises a crank arm, a first sprocket, and a second sprocket. The first sprocket is coupled to the crank arm to integrally rotate with the crank arm about a rotational center axis. The first sprocket comprises a first sprocket body and a plurality of first sprocket teeth. The first sprocket body includes a first outer periphery. The plurality of first sprocket teeth is provided on the first outer periphery. The plurality of first sprocket teeth includes at least one first tooth provided on the first outer periphery to be received in only an outer link space defined between a pair of outer link plates of a bicycle chain. The second sprocket is coupled to the crank arm to integrally rotate with the crank arm about the rotational center axis. The second sprocket comprises a second sprocket body and a plurality of second sprocket teeth. The second sprocket body includes a second outer periphery. The plurality of second sprocket teeth is provided on the second outer periphery. The plurality of second sprocket teeth includes at least one second tooth provided on the second outer periphery to be engaged with the bicycle chain. One of the first sprocket and the second sprocket has a pitch-circle diameter larger than a pitch-circle diameter of the other of the first sprocket and the second sprocket. The one of the first sprocket and the second sprocket comprises a first shifting facilitation area and a second shifting facilitation area. The first shifting facilitation area is to facilitate a first shifting operation in which the bicycle chain is shifted from the second sprocket toward the first sprocket in a first chain-phase state in which a reference tooth of the plurality of second sprocket teeth is received in the outer link space. The second shifting facilitation area is to facilitate a second shifting operation in which the bicycle chain is shifted from the second sprocket toward the first sprocket in a second chain-phase state in which the reference tooth of the plurality of second sprocket teeth is received in an inner link space defined between a pair of inner link plates of the bicycle chain.

With the bicycle crank assembly according to the first aspect, it is possible to smoothly shift the bicycle chain from the second sprocket to the first sprocket in each of the first chain-phase state and the second chain-phase state different from the first chain-phase state.

In accordance with a second aspect of the present invention, the bicycle crank assembly according to the first aspect is configured so that the at least one first tooth includes a plurality of first teeth provided on the first outer periphery to be received in only the outer link space. The at least one second tooth includes a plurality of second teeth provided on the second outer periphery to be capable of being received in each of the outer link space and the inner link space.

With the bicycle crank assembly according to the second aspect, it is possible to smoothly shift the bicycle chain from the second sprocket to the first sprocket in each of the first chain-phase state and the second chain-phase state different from the first chain-phase state.

In accordance with a third aspect of the present invention, the bicycle crank assembly according to the first or second aspect is configured so that the plurality of first sprocket teeth includes at least one first additional tooth provided on the first outer periphery to be received in only the inner link space.

With the bicycle crank assembly according to the third aspect, it is possible to improve chain-holding performance of the first sprocket. Furthermore, the first sprocket has only one chain-phase state since the at least one first additional tooth is received in only the inner link space. This makes it easier for the user to set the bicycle chain to the first sprocket.

In accordance with a fourth aspect of the present invention, the bicycle crank assembly according to any one of the first to third aspects is configured so that the first sprocket body has a first reference center plane perpendicular to the rotational center axis. The at least one first tooth has a first maximum width and a first tooth center plane. The first maximum width is defined in an axial direction parallel to the rotational center axis. The first tooth center plane is defined to bisect the first maximum width in the axial direction and offset from the first reference center plane in the axial direction.

With the bicycle crank assembly according to the fourth aspect, it is possible to save weight of the first sprocket with improving the chain-holding performance.

In accordance with a fifth aspect of the present invention, the bicycle crank assembly according to any one of the first to fourth aspects is configured so that the first sprocket comprises at least one first additional tooth provided on the first outer periphery to be received in only the inner link space. The at least one first tooth and the at least one first additional tooth are alternatingly arranged in a circumferential direction defined about the rotational center axis.

With the bicycle crank assembly according to the fifth aspect, it is possible to improve chain-holding performance of the first sprocket.

In accordance with a sixth aspect of the present invention, the bicycle crank assembly according to any one of the first to fifth aspects is configured so that the first sprocket has a first pitch-circle diameter defined by the plurality of first sprocket teeth. The second sprocket has a second pitch-circle diameter defined by the plurality of second sprocket teeth. The second pitch-circle diameter is larger than the first pitch-circle diameter.

With the bicycle crank assembly according to the sixth aspect, it is possible to smoothly shift the bicycle chain from the second sprocket to the first sprocket in each of the first chain-phase state and the second chain-phase state different from the first chain-phase state.

In accordance with a seventh aspect of the present invention, the bicycle crank assembly according to the sixth aspect is configured so that the at least one second tooth includes a first derailing tooth and a second derailing tooth. The first derailing tooth is provided in the first shifting facilitation area to first derail the bicycle chain from the second sprocket in the first shifting operation. The second derailing tooth is provided in the second shifting facilitation area to first derail the bicycle chain from the second sprocket in the second shifting operation.

With the bicycle crank assembly according to the seventh aspect, it is possible to smoothly derail the bicycle chain from the second sprocket in each of the first chain-phase state and the second chain-phase state different from the first chain-phase state.

In accordance with an eighth aspect of the present invention, the bicycle crank assembly according to the sixth or seventh aspect is configured so that the at least one second tooth includes at least one chain-driving tooth provided outside the first shifting facilitation area and the second shifting facilitation area. The at least one chain-driving tooth has a reference radial length defined radially outward from the second outer periphery. The first derailing tooth has a first radial length defined radially outward from the second outer periphery. The first radial length is shorter than the reference radial length. The second derailing tooth has a second radial length defined radially outward from the second outer periphery, the second radial length being shorter than the reference radial length.

With the bicycle crank assembly according to the eighth aspect, it is possible to more smoothly derail the bicycle chain from the second sprocket in each of the first chain-phase state and the second chain-phase state different from the first chain-phase state.

In accordance with a ninth aspect of the present invention, the bicycle crank assembly according to any one of the first to eighth aspect is configured so that the first shifting facilitation area at least partly overlaps with the second shifting facilitation area in a circumferential direction defined about the rotational center axis.

With the bicycle crank assembly according to the ninth aspect, it is possible to make a total area of the first and second shifting facilitation areas smaller. This increases driving teeth provided outside of the first and second shifting facilitation areas, improving chain-holding performance of the second tooth.

In accordance with a tenth aspect of the present invention, the bicycle crank assembly according to any one of the seventh to ninth aspects is configured so that the first derailing tooth is adjacent to the second derailing tooth without another tooth between the first derailing tooth and the second derailing tooth in a circumferential direction defined about the rotational center axis.

With the bicycle crank assembly according to the tenth aspect, it is possible to smoothly derail the bicycle chain from the second sprocket in each of the first chain-phase state and the second chain-phase state different from the first chain-phase state.

In accordance with an eleventh aspect of the present invention, the bicycle crank assembly according to any one of the first to tenth aspects is configured so that the second sprocket comprises a shifting facilitation projection provided in the second shifting facilitation area to facilitate the second shifting operation.

With the bicycle crank assembly according to the eleventh aspect, it is possible to effectively facilitate the second shifting operation by using the shifting facilitation projection. This can smoothen shifting of the bicycle chain from the second sprocket to the first sprocket in each of the first chain-phase state and the second chain-phase state different from the first chain-phase state.

In accordance with a twelfth aspect of the present invention, the bicycle crank assembly according to the eleventh aspect is configured so that the shifting facilitation projection is provided on an upstream side of the second derailing tooth in a driving rotational direction in which the bicycle crank assembly rotates about the rotational center axis during pedaling.

With the bicycle crank assembly according to the twelfth aspect, it is possible to more smoothly shift the bicycle chain from the second sprocket to the first sprocket in each of the first chain-phase state and the second chain-phase state different from the first chain-phase state.

In accordance with a thirteenth aspect of the present invention, the bicycle crank assembly according to the twelfth aspect is configured so that the at least one second tooth includes an adjacent tooth closest to the shifting facilitation projection among the at least one second tooth. The second derailing tooth is adjacent to the adjacent tooth without another tooth between the second derailing tooth and the adjacent tooth in the driving rotational direction.

With the bicycle crank assembly according to the thirteenth aspect, it is possible to more smoothly shift the bicycle chain from the second sprocket to the first sprocket in each of the first chain-phase state and the second chain-phase state different from the first chain-phase state.

In accordance with a fourteenth aspect of the present invention, the bicycle crank assembly according to any the eleventh to thirteenth aspects is configured so that the second sprocket comprises a bump portion provided in the second shifting facilitation area to restrict engagement of the shifting facilitation projection with the bicycle chain in the first shifting operation.

With the bicycle crank assembly according to the fourteenth aspect, the bump portion and the shifting facilitation projection differentiate a first route of the bicycle chain in the first chain-phase state and a second route of the bicycle chain in the second chain-phase state. This smoothens shifting of the bicycle chain from the second sprocket to the first sprocket in each of the first chain-phase state and the second chain-phase state.

In accordance with a fifteenth aspect of the present invention, the bicycle crank assembly according to the fourteenth aspect is configured so that the bump portion is provided on a downstream side of the shifting facilitation projection in a driving rotational direction in which the bicycle crank assembly rotates about the rotational center axis during pedaling.

With the bicycle crank assembly according to the fifteenth aspect, it is possible to certainly restrict engagement of the shifting facilitation projection with the bicycle chain in the first shifting operation. This certainly smoothens shifting of the bicycle chain from the second sprocket to the first sprocket in each of the first chain-phase state and the second chain-phase state.

In accordance with a sixteenth aspect of the present invention, the bicycle crank assembly according to the fourteenth or fifteenth aspect is configured so that the bump portion includes a guide surface to guide the bicycle chain toward the first sprocket in an axial direction parallel to the rotational center axis in the second shifting operation.

With the bicycle crank assembly according to the sixteenth aspect, it is possible to more certainly restrict engagement of the shifting facilitation projection with the bicycle chain in the first shifting operation. This more certainly smoothens shifting of the bicycle chain from the second sprocket to the first sprocket in each of the first chain-phase state and the second chain-phase state.

In accordance with a seventeenth aspect of the present invention, the bicycle crank assembly according to any one of the fourteenth to sixteenth aspects is configured so that the shifting facilitation projection has a first amount of projection defined from the second sprocket body in an axial direction parallel to the rotational center axis. The bump portion has a second amount of projection defined from the second sprocket body in the axial direction. The second amount of projection is larger than the first amount of projection.

With the bicycle crank assembly according to the seventeenth aspect, it is possible to certainly restrict engagement of the shifting facilitation projection with the bicycle chain in the first shifting operation. This certainly smoothens shifting of the bicycle chain from the second sprocket to the first sprocket in each of the first chain-phase state and the second chain-phase state.

In accordance with an eighteenth aspect of the present invention, the bicycle crank assembly according to any one of the seventh to seventeenth aspects is configured so that the second sprocket comprises an axial surface and a reverse axial surface. The axial surface faces toward the first sprocket in an axial direction parallel to the rotational center axis. The reverse axial surface is provided on a reverse side of the axial surface in the axial direction. The first derailing tooth includes a first upstream chamfer provided on the axial surface. The first upstream chamfer is provided on an upstream side in the first derailing tooth in a driving rotational direction in which the bicycle crank assembly rotates about the rotational center axis during pedaling.

With the bicycle crank assembly according to the eighteenth aspect, it is possible to smoothly derail the bicycle chain from the second sprocket at the first derailing tooth. This smoothens shifting of the bicycle chain from the second sprocket to the first sprocket in at least one of the first chain-phase state and the second chain-phase state.

In accordance with a nineteenth aspect of the present invention, the bicycle crank assembly according to any one of the seventh to eighteenth aspects is configured so that the second sprocket comprises an axial surface and a reverse axial surface. The axial surface faces toward the first sprocket in an axial direction parallel to the rotational center axis. The reverse axial surface is provided on a reverse side of the axial surface in the axial direction. The first derailing tooth includes a first reverse upstream chamfer provided on the reverse axial surface. The first reverse upstream chamfer is provided on an upstream side in the first derailing tooth in a driving rotational direction in which the bicycle crank assembly rotates about the rotational center axis during pedaling.

With the bicycle crank assembly according to the nineteenth aspect, it is possible to smoothly derail the bicycle chain from the second sprocket at the second derailing tooth. This smoothens shifting of the bicycle chain from the second sprocket to the first sprocket in at least one of the first chain-phase state and the second chain-phase state.

In accordance with a twentieth aspect of the present invention, the bicycle crank assembly according to any one of the seventh to nineteenth aspects is configured so that the second sprocket comprises an axial surface and a reverse axial surface. The axial surface faces toward the first sprocket in an axial direction parallel to the rotational center axis. The reverse axial surface is provided on a reverse side of the axial surface in the axial direction. The first derailing tooth includes a first downstream chamfer provided on the axial surface. The first downstream chamfer is provided on a downstream side in the first derailing tooth in a driving rotational direction in which the bicycle crank assembly rotates about the rotational center axis during pedaling.

With the bicycle crank assembly according to the twentieth aspect, it is possible to certainly derail the bicycle chain from the second sprocket at the first derailing tooth.

In accordance with a twenty-first aspect of the present invention, the bicycle crank assembly according to any one of the seventh to twentieth aspects is configured so that the second sprocket comprises an axial surface and a reverse axial surface. The axial surface faces toward the first sprocket in an axial direction parallel to the rotational center axis. The reverse axial surface is provided on a reverse side of the axial surface in the axial direction. The second derailing tooth includes a second downstream chamfer provided on the axial surface. The second downstream chamfer is provided on a downstream side in the second derailing tooth in a driving rotational direction in which the bicycle crank assembly rotates about the rotational center axis during pedaling.

With the bicycle crank assembly according to the twenty-first aspect, it is possible to smoothly derail the bicycle chain from the second sprocket at the second derailing tooth.

In accordance with a twenty-second aspect of the present invention, the bicycle crank assembly according to any one of the first to fifth, ninth, and eleventh to seventeenth aspects is configured so that the first sprocket has a first pitch-circle diameter defined by the plurality of first sprocket teeth. The second sprocket has a second pitch-circle diameter defined by the plurality of second sprocket teeth. The first pitch-circle diameter is larger than the second pitch-circle diameter.

With the bicycle crank assembly according to the twenty-second aspect, it is possible to smoothly shift the bicycle chain from the second sprocket to the first sprocket in each of the first chain-phase state and the second chain-phase state different from the first chain-phase state.

In accordance with a twenty-third aspect of the present invention, the bicycle crank assembly according to any one of the first to twentieth aspects is configured so that all the plurality of second sprocket teeth are capable of being received in each of the outer link space and the inner link space.

With the bicycle crank assembly according to the twenty-third aspect, it is possible to smoothly shift the bicycle chain from the second sprocket to the first sprocket in each of the first chain-phase state and the second chain-phase state different from the first chain-phase state.

In accordance with a twenty-fourth aspect of the present invention, a bicycle sprocket assembly comprises a first sprocket and a second sprocket. The first sprocket comprises a first sprocket body, a plurality of first sprocket teeth, and the first pitch-circle diameter. The first sprocket body includes a first outer periphery. The plurality of first sprocket teeth is provided on the first outer periphery. The plurality of first sprocket teeth includes at least one first tooth provided on the first outer periphery to be received in only an outer link space defined between a pair of outer link plates of a bicycle chain. The first pitch-circle diameter is defined by the plurality of first sprocket teeth. The second sprocket comprises a second sprocket body, a plurality of second sprocket teeth, and a second pitch-circle diameter. The second sprocket body includes a second outer periphery. The plurality of second sprocket teeth is provided on the second outer periphery. The plurality of second sprocket teeth includes at least one second tooth provided on the second outer periphery to be capable of being received in each of the outer link space and an inner link space defined between a pair of inner link plates of the bicycle chain. The second pitch-circle diameter is defined by the plurality of second sprocket teeth and larger than the first pitch-circle diameter.

With the bicycle sprocket assembly according to the twenty-fourth aspect, it is possible to smoothly shift the bicycle chain from the second sprocket to the first sprocket with improving chain-holding performance.

In accordance with a twenty-fifth aspect of the present invention, the bicycle sprocket assembly according to the twenty-fourth aspect is configured so that the at least one first tooth includes a plurality of first teeth provided on the first outer periphery to be received in only the outer link space. The at least one second tooth includes a plurality of second teeth provided on the second outer periphery to be capable of being received in each of the outer link space and the inner link space.

With the bicycle sprocket assembly according to the twenty-fifth aspect, it is possible to smoothly shift the bicycle chain from the second sprocket to the first sprocket with improving chain-holding performance.

In accordance with a twenty-sixth aspect of the present invention, the bicycle sprocket assembly according to the twenty-fourth or twenty-fifth aspect is configured so that the second sprocket comprises a first shifting facilitation area and a second shifting facilitation area. The first shifting facilitation area is to facilitate a first shifting operation in which the bicycle chain is shifted from the second sprocket toward the first sprocket in a first chain-phase state in which a reference tooth of the plurality of second sprocket teeth is received in the outer link space. The second shifting facilitation area is to facilitate a second shifting operation in which the bicycle chain is shifted from the second sprocket toward the first sprocket in a second chain-phase state in which a reference tooth of the plurality of second sprocket teeth is received in the inner link space.

With the bicycle sprocket assembly according to the twenty-sixth aspect, it is possible to smoothly shift the bicycle chain from the second sprocket to the first sprocket in each of the first chain-phase state and the second chain-phase state with improving chain-holding performance.

In accordance with a twenty-seventh aspect of the present invention, the bicycle sprocket assembly according to any one of the twenty-fourth to twenty-sixth aspects is configured so that the plurality of first sprocket teeth includes at least one first additional tooth provided on the first outer periphery of the first sprocket body to be received in only the inner link space.

With the bicycle sprocket assembly according to the twenty-seventh aspect, it is possible to improve chain-holding performance of the first sprocket.

In accordance with a twenty-eighth aspect of the present invention, the bicycle sprocket assembly according to any one of the twenty-fourth to twenty-seventh aspects is configured so that the first sprocket body has a first reference center plane perpendicular to the rotational center axis. The at least one first tooth has a first maximum width and a first tooth center plane. The first maximum width is defined in an axial direction parallel to the rotational center axis. The first tooth center plane is defined to bisect the first maximum width in the axial direction and offset from the first reference center plane in the axial direction.

With the bicycle sprocket assembly according to the twenty-eighth aspect, it is possible to save weight of the first sprocket with improving the chain-holding performance.

In accordance with a twenty-ninth aspect of the present invention, the bicycle sprocket assembly according to any one of the twenty-fourth to twenty-eighth aspects is configured so that all the plurality of second sprocket teeth are capable of being received in each of the outer link space and the inner link space.

With the bicycle sprocket assembly according to the twenty-ninth aspect, it is possible to smoothly shift the bicycle chain from the second sprocket to the first sprocket in each of the first chain-phase state and the second chain-phase state different from the first chain-phase state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
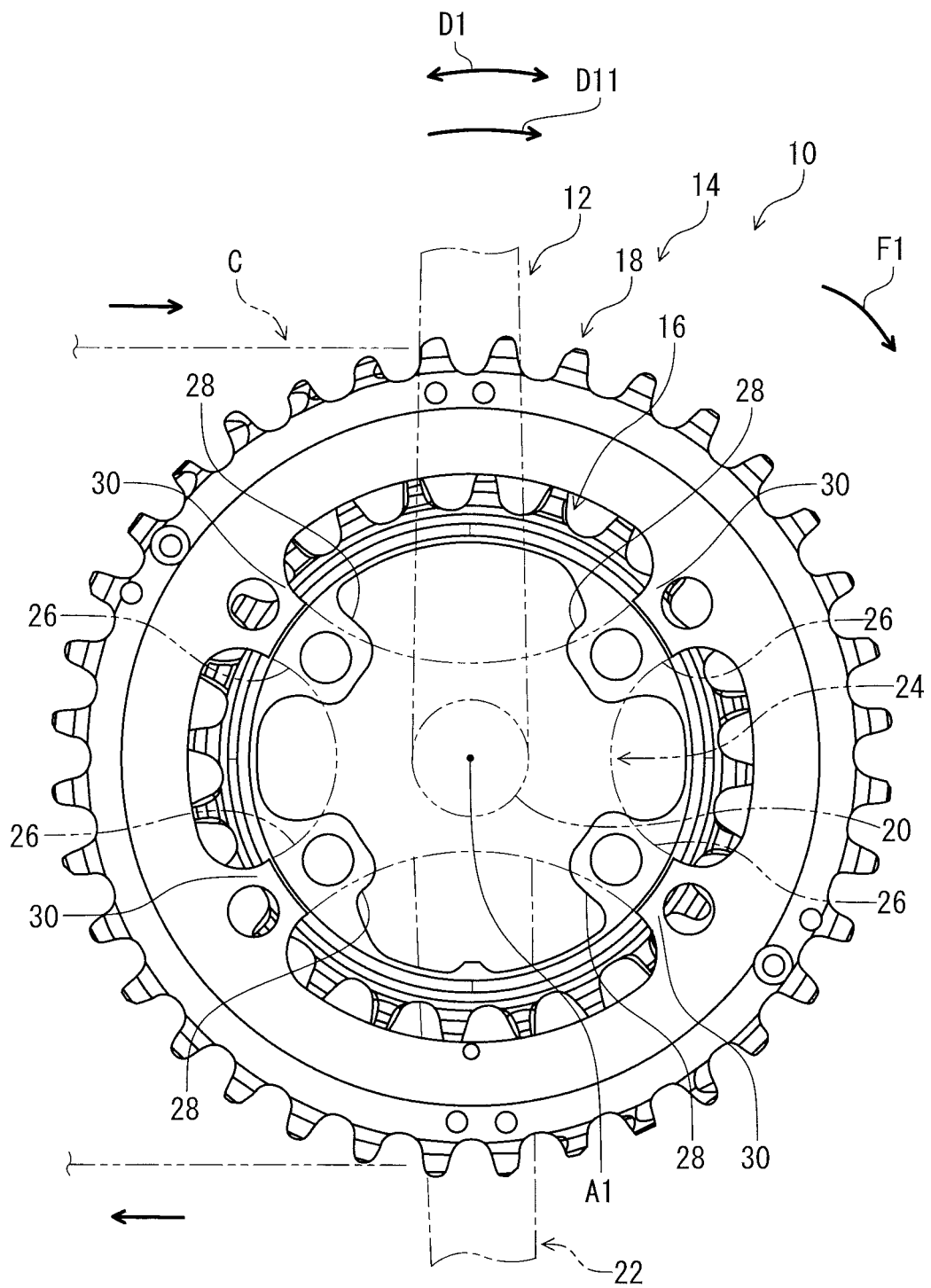
FIG. 1 is a side elevational view of a bicycle crank assembly in accordance with a first embodiment.

The embodiment(s) will now be described with reference to the accompanying drawings, wherein like reference numerals designate corresponding or identical elements throughout the various drawings.

First Embodiment

Figure 2:
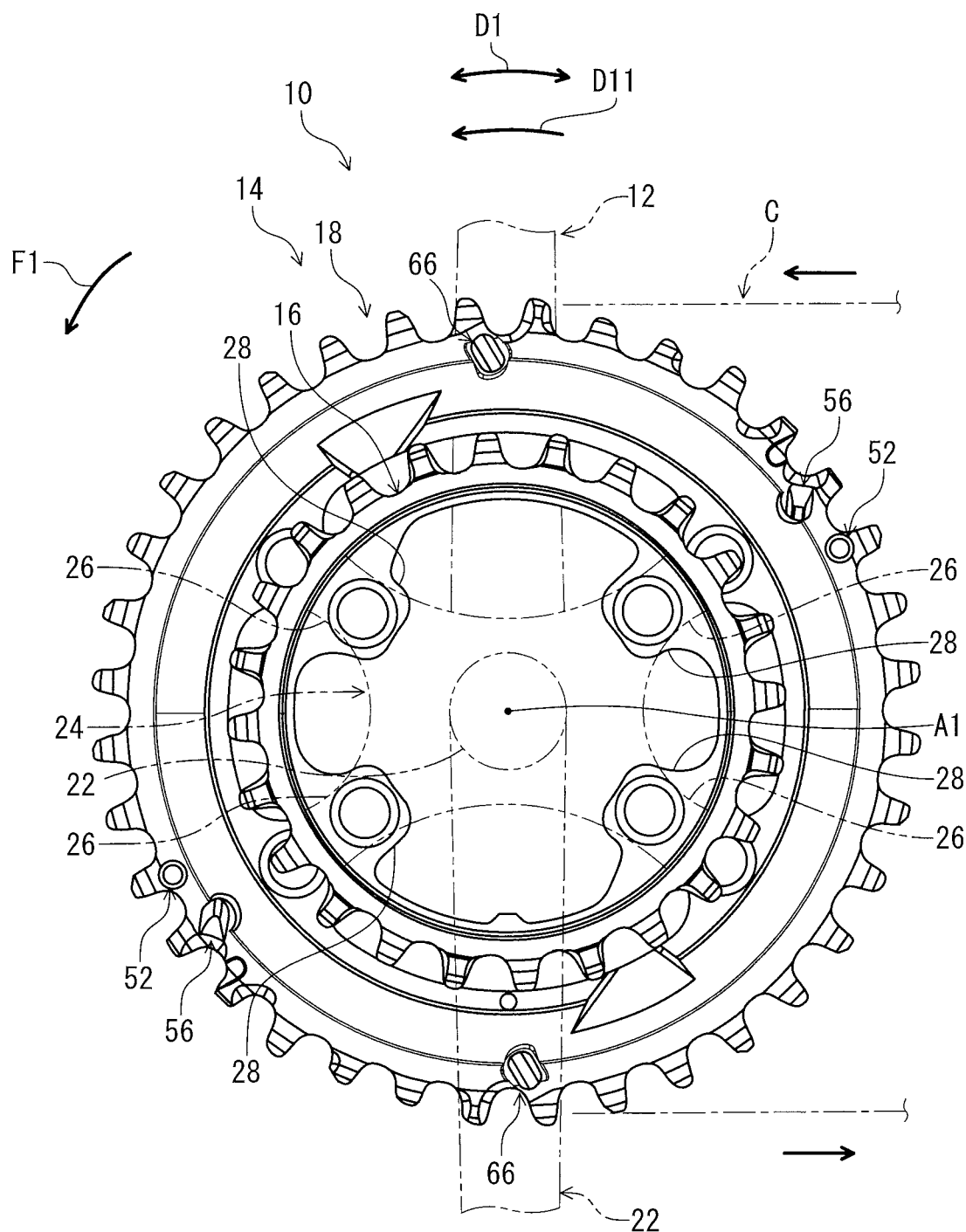
FIG. 2 is another side elevational view of the bicycle crank assembly illustrated in FIG. 1.

Referring initially to FIGS. 1 and 2, a bicycle crank assembly 10 in accordance with a first embodiment comprises a crank arm 12 and a bicycle sprocket assembly 14. The bicycle sprocket assembly 14 comprises a first sprocket 16 and a second sprocket 18. Namely, the bicycle crank assembly 10 comprises the first sprocket 16 and the second sprocket 18. The bicycle crank assembly 10 comprises a crank axle 20 and an additional crank arm 22. The crank arm 12 is a right crank arm. The additional crank arm 22 is a left crank arm. The crank arm 12 and the additional crank arm 22 are secured to the crank axle 20.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle crank assembly 10, should be interpreted relative to the bicycle equipped with the bicycle crank assembly 10 as used in an upright riding position on a horizontal surface.

As seen in FIGS. 1 and 2, the bicycle crank assembly 10 has a rotational center axis A1 and is rotatable relative to a bicycle frame (not shown) about the rotational center axis A1. The bicycle crank assembly 10 is rotated about the rotational center axis A1 in a driving rotational direction D11 during pedaling. The driving rotational direction D11 is defined along a circumferential direction D1 defined about the rotational center axis A1.

The first sprocket 16 and the second sprocket 18 are engaged with a bicycle chain C to transmit a rotational driving force F1 to the bicycle chain C. The bicycle chain C is shifted between the first sprocket 16 and the second sprocket 18 by a front derailleur (not shown). In this embodiment, the bicycle sprocket assembly 14 is a front sprocket assembly. However, at least one of the structures of the first and second sprockets 16 and 18 can be at least partly applied to a rear sprocket.

The first sprocket 16 is coupled to the crank arm 12 to integrally rotate with the crank arm 12 about the rotational center axis A1. The second sprocket 18 is coupled to the crank arm 12 to integrally rotate with the crank arm 12 about the rotational center axis A1. In this embodiment, the bicycle sprocket assembly 14 includes a sprocket mounting member 24. The sprocket mounting member 24 is mounted on the crank arm 12 to be rotatable integrally with the crank arm 12 about the rotational center axis A1. The first sprocket 16 and the second sprocket 18 are coupled to the sprocket mounting member 24. The sprocket mounting member 24 includes crank connecting arms 26. The first sprocket 16 comprises first crank attachment portions 28. The second sprocket 18 comprises second crank attachment portions 30. The crank connecting arms 26 are respectively fastened to the first crank attachment portions 28 with fasteners such as bolts (not shown). The second crank attachment portions 30 are fastened to the sprocket mounting member 24 with fasteners such as bolts (not shown).

In this embodiment, the sprocket mounting member 24 is integrally provided with the crank arm 12 as a one-piece unitary member. However, the sprocket mounting member 24 can be a separate member from the crank arm 12. Furthermore, the sprocket mounting member 24 can be omitted from the bicycle sprocket assembly 14. In such an embodiment, the first sprocket 16 and the second sprocket 18 can be directly coupled to the crank arm 12 and the crank axle 20. The sprocket mounting member 24 can be integrally provided with one of the first sprocket 16, the second sprocket 18, and the crank axle 20.

Figure 3:
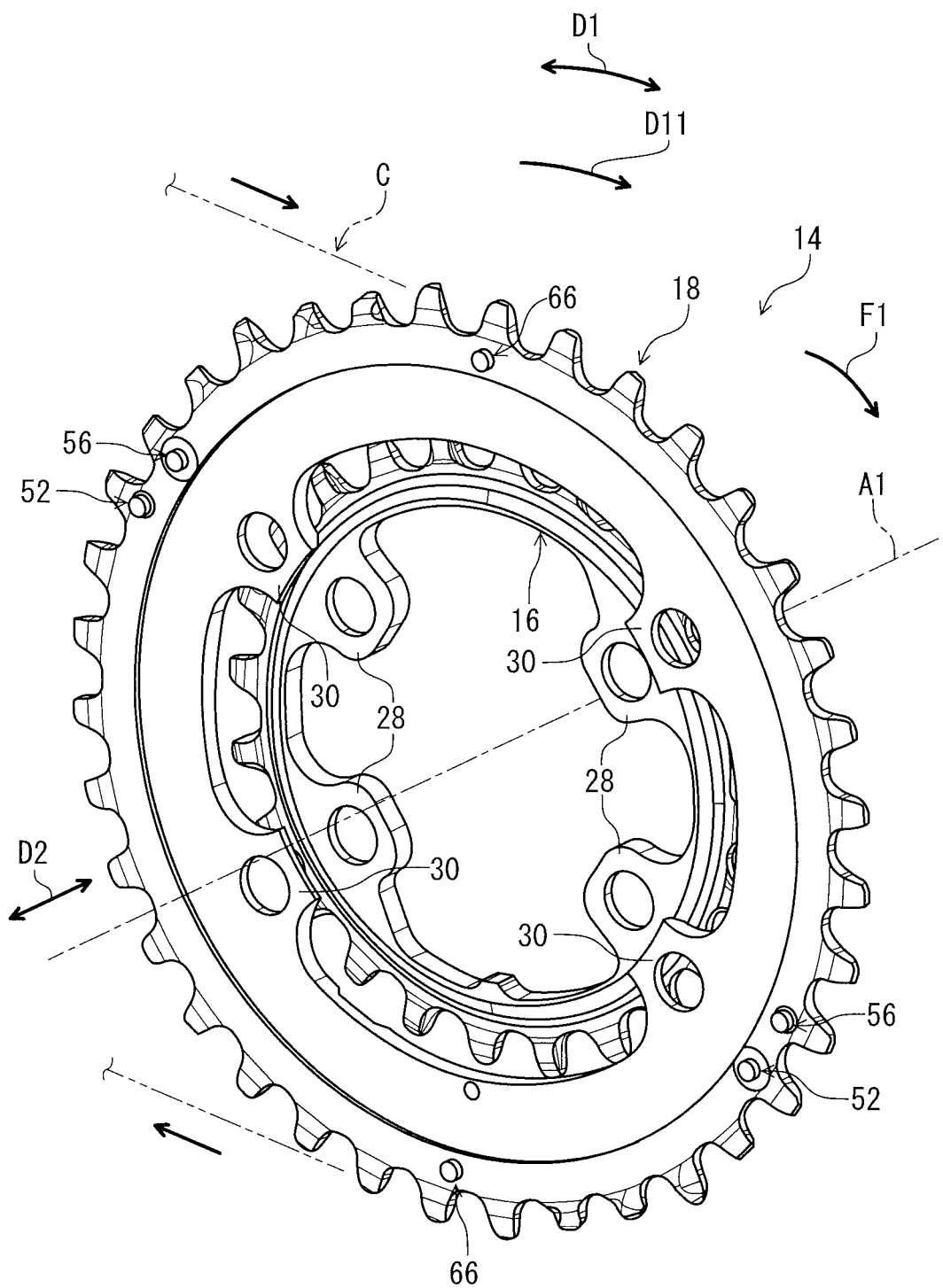
FIG. 3 is a perspective view of a bicycle sprocket assembly of the bicycle crank assembly illustrated in FIG. 1.
Figure 4:
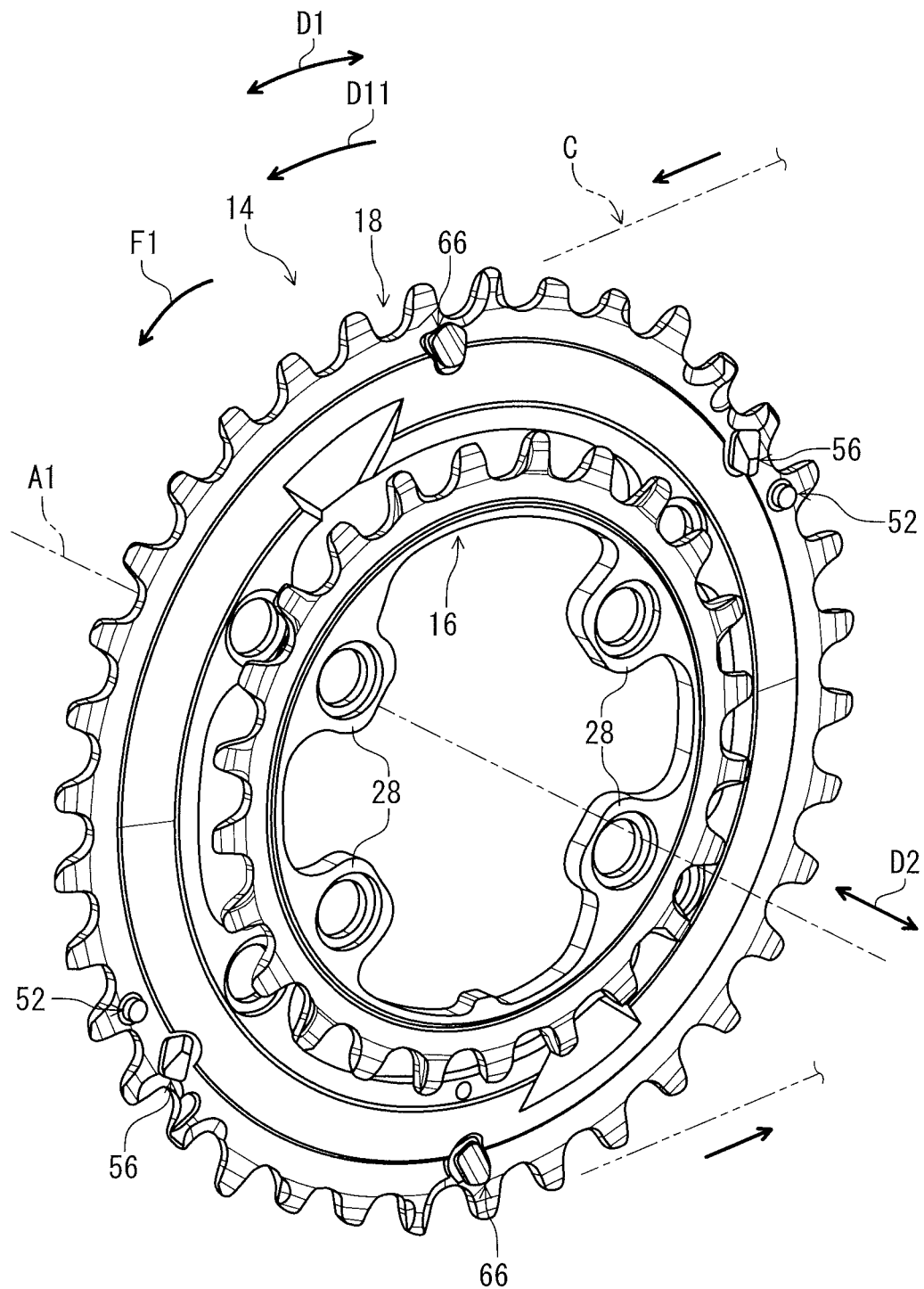
FIG. 4 is another perspective view of the bicycle sprocket assembly of the bicycle crank assembly illustrated in FIG. 1.

As seen in FIGS. 3 and 4, the bicycle sprocket assembly 14 includes the first sprocket 16 and the second sprocket 18. However, the bicycle sprocket assembly 14 can include at least three sprockets. In such an embodiment, for example, two of the sprockets have the same structure as that of the second sprocket 18. One of the sprockets has the same structure as that of the first sprocket 16 and is provided between the second sprockets 18. In another embodiment, two of the sprockets have the same structure as that of the first sprocket 16. One of the sprockets has the same structure as that of the second sprocket 18 and is provided between the first sprockets 16. The above examples of the arrangement of the sprockets can be applied to each of front and rear sprocket assemblies.

The first sprocket 16 is adjacent to the second sprocket 18 in an axial direction D2 parallel to the rotational center axis A1 without another sprocket between the first sprocket 16 and the second sprocket 18.

Figure 5:
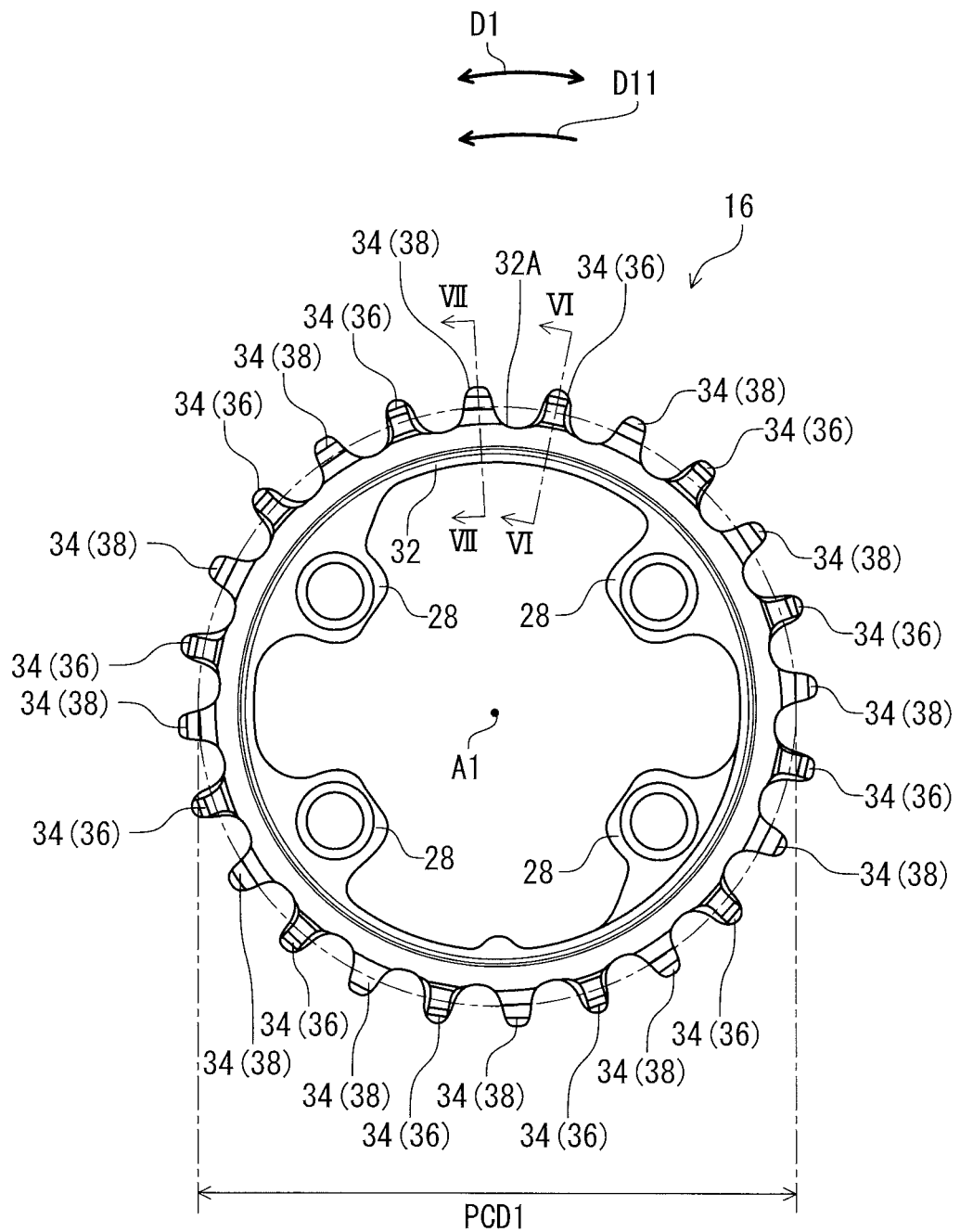
FIG. 5 is a side elevational view of a first sprocket of the bicycle sprocket assembly illustrated in FIG. 3.
Figure 6:
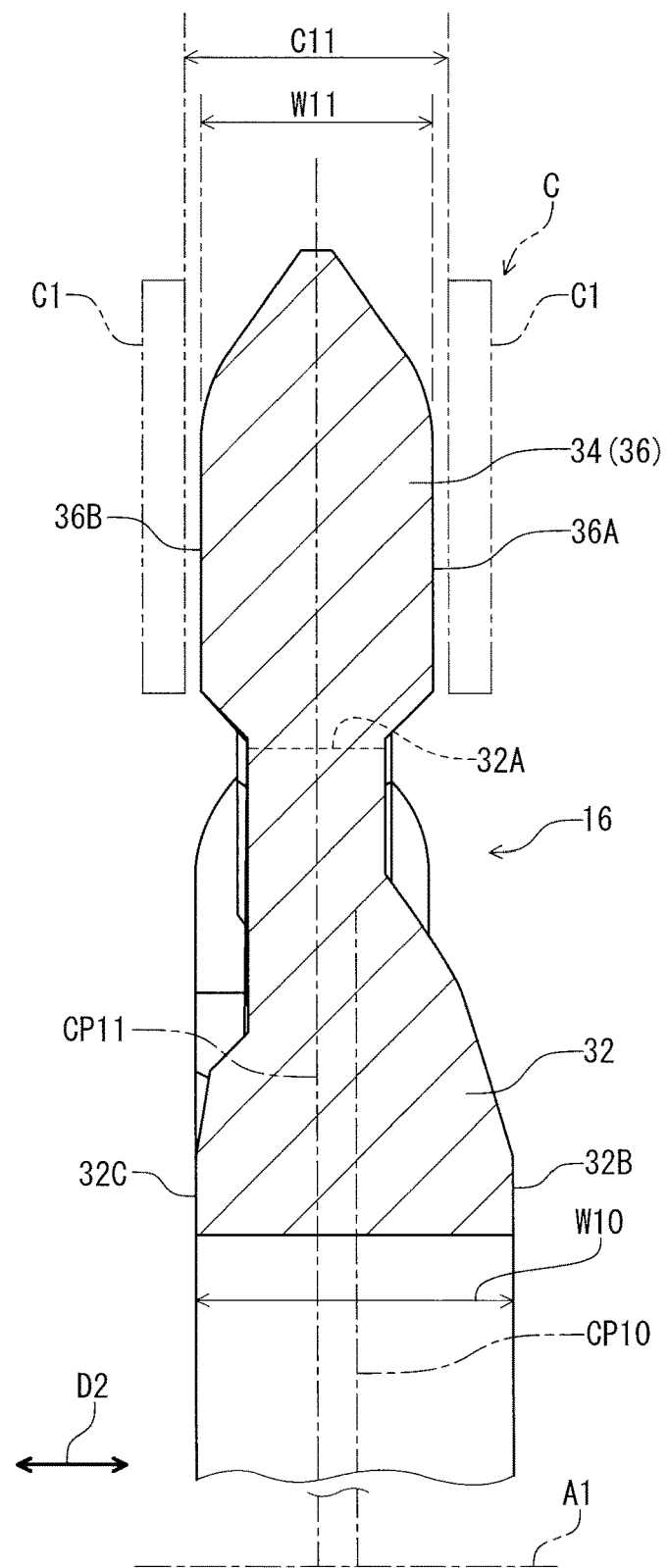
FIG. 6 is a cross-sectional view of the first sprocket taken along line VI-VI of FIG. 5.

As seen in FIGS. 5 and 6, the first sprocket 16 comprises a first sprocket body 32 and a plurality of first sprocket teeth 34. The first sprocket body 32 includes a first outer periphery 32A. The plurality of first sprocket teeth 34 is provided on the first outer periphery 32A. The plurality of first sprocket teeth 34 includes at least one first tooth 36 provided on the first outer periphery 32A to be received in only an outer link space C11 defined between a pair of outer link plates C1 of the bicycle chain C. In this embodiment, the at least one first tooth 36 includes a plurality of first teeth 36 provided on the first outer periphery 32A to be received in only the outer link space C11 in a driving state where the plurality of first sprocket teeth 34 engages with the bicycle chain C during pedaling.

Figure 7:
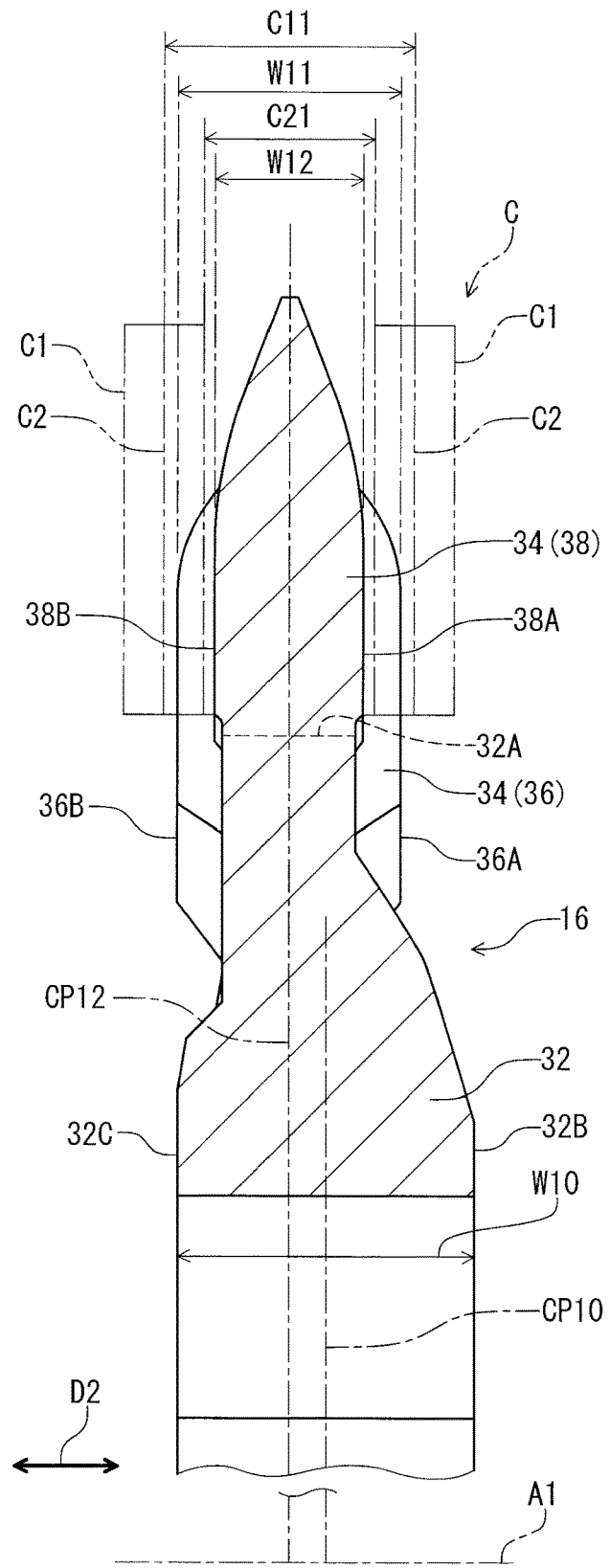
FIG. 7 is a cross-sectional view of the first sprocket taken along line VII-VII of FIG. 5.

As seen in FIGS. 5 and 7, the plurality of first sprocket teeth 34 includes at least one first additional tooth 38 provided on the first outer periphery 32A to be received in only an inner link space C21 defined between a pair of inner link plates C2 of the bicycle chain C. In this embodiment, the at least one first additional tooth 38 includes a plurality of first additional teeth 38 provided on the first outer periphery 32A to be received in only the inner link space C21 in the driving state.

As seen in FIG. 5, the at least one first tooth 36 and the at least one first additional tooth 38 are alternatingly arranged in the circumferential direction D1 defined about the rotational center axis A1. The plurality of first teeth 36 and the plurality of first additional teeth 38 are alternatingly arranged in the circumferential direction D1. However, the arrangement of the first teeth 36 and the first additional teeth 38 is not limited to this embodiment.

As seen in FIG. 6, the first sprocket body 32 has a first reference center plane CP10 perpendicular to the rotational center axis A1. The at least one first tooth 36 has a first maximum width W11 and a first tooth center plane CP11. The first maximum width W11 is defined in the axial direction D2 parallel to the rotational center axis A1. The first tooth center plane CP11 is defined to bisect the first maximum width W11 in the axial direction D2 and offset from the first reference center plane CP10 in the axial direction D2 (axially inboard direction or axially outboard direction). However, the first tooth center plane CP11 of the first tooth 36 can be disposed to coincide with the first reference center plane CP10 in the axial direction D2.

In this embodiment, the first sprocket 16 comprises a first axial surface 32B and a first reverse axial surface 32C. The first axial surface 32B faces toward the second sprocket 18 in the axial direction D2. The first reverse axial surface 32C is provided on a reverse side of the first axial surface 32B in the axial direction D2. The first axial surface 32B and the first reverse axial surface 32C are defined on the first sprocket body 32. The first sprocket body 32 has a first body maximum width W10 defined between the first axial surface 32B and the first reverse axial surface 32C in the axial direction D2. The first reference center plane CP10 is defined to bisect the first body maximum width W10 in the axial direction D2.

Furthermore, the first tooth 36 includes a chain-engagement surface 36A and an additional chain-engagement surface 36B. The chain-engagement surface 36A faces in the axial direction D2 and is contactable with one of the pair of outer link plates C1. The additional chain-engagement surface 36B faces in the axial direction D2 and is contactable with the other of the pair of outer link plates C1. The additional chain-engagement surface 36B is provided on a reverse side of the chain-engagement surface 36A in the axial direction D2. The first maximum width W11 is defined between the chain-engagement surface 36A and the additional chain-engagement surface 36B in the axial direction D2. The first maximum width W11 is smaller than the first body maximum width W10.

As seen in FIG. 7, the at least one first additional tooth 38 has a first additional maximum width W12 and a first additional tooth center plane CP12. The first additional maximum width W12 is defined in the axial direction D2. The first additional tooth center plane CP12 is defined to bisect the first additional maximum width W12 in the axial direction D2 and offset from the first reference center plane CP10 in the axial direction D2. However, the first additional tooth center plane CP12 of the at least one first additional tooth 38 can be disposed to coincide with the first reference center plane CP10 in the axial direction D2. The first additional tooth center plane CP12 is defined to coincide with the first tooth center plane CP11. However, the first additional tooth center plane CP12 can be offset from the first tooth center plane CP11 in the axial direction D2.

In this embodiment, the first additional tooth 38 includes a chain-engagement surface 38A and an additional chain-engagement surface 38B. The chain-engagement surface 38A faces in the axial direction D2 and is contactable with one of the pair of inner link plates C2. The additional chain-engagement surface 38B faces in the axial direction D2 and is contactable with the other of the pair of inner link plates C2. The additional chain-engagement surface 38B is provided on a reverse side of the chain-engagement surface 38A in the axial direction D2. The first additional maximum width W12 is defined between the chain-engagement surface 38A and the additional chain-engagement surface 38B in the axial direction D2. The first additional maximum width W12 is smaller than the first body maximum width W10.

Figure 8:
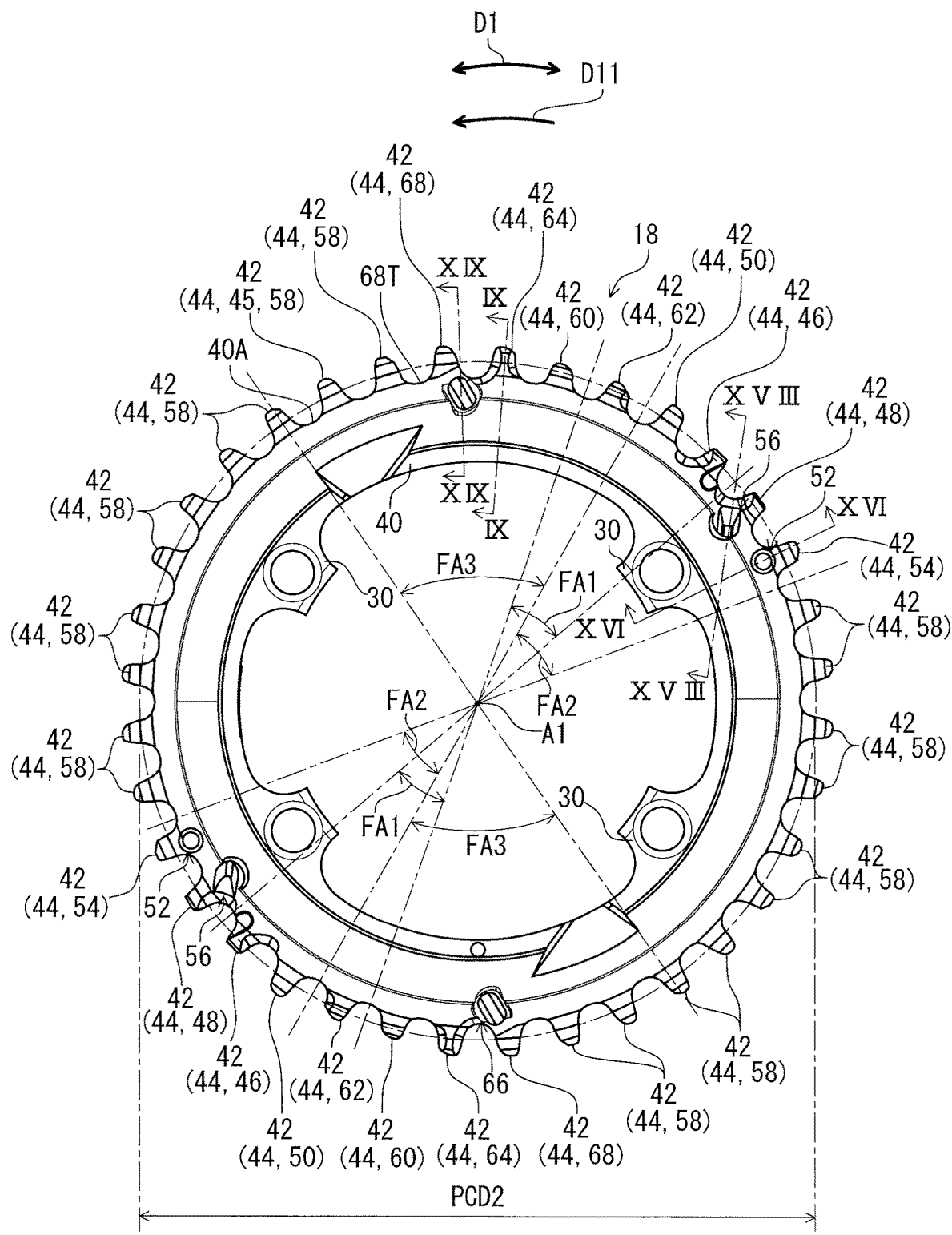
FIG. 8 is a side elevational view of a second sprocket of the bicycle sprocket assembly illustrated in FIG. 3.
Figure 9:
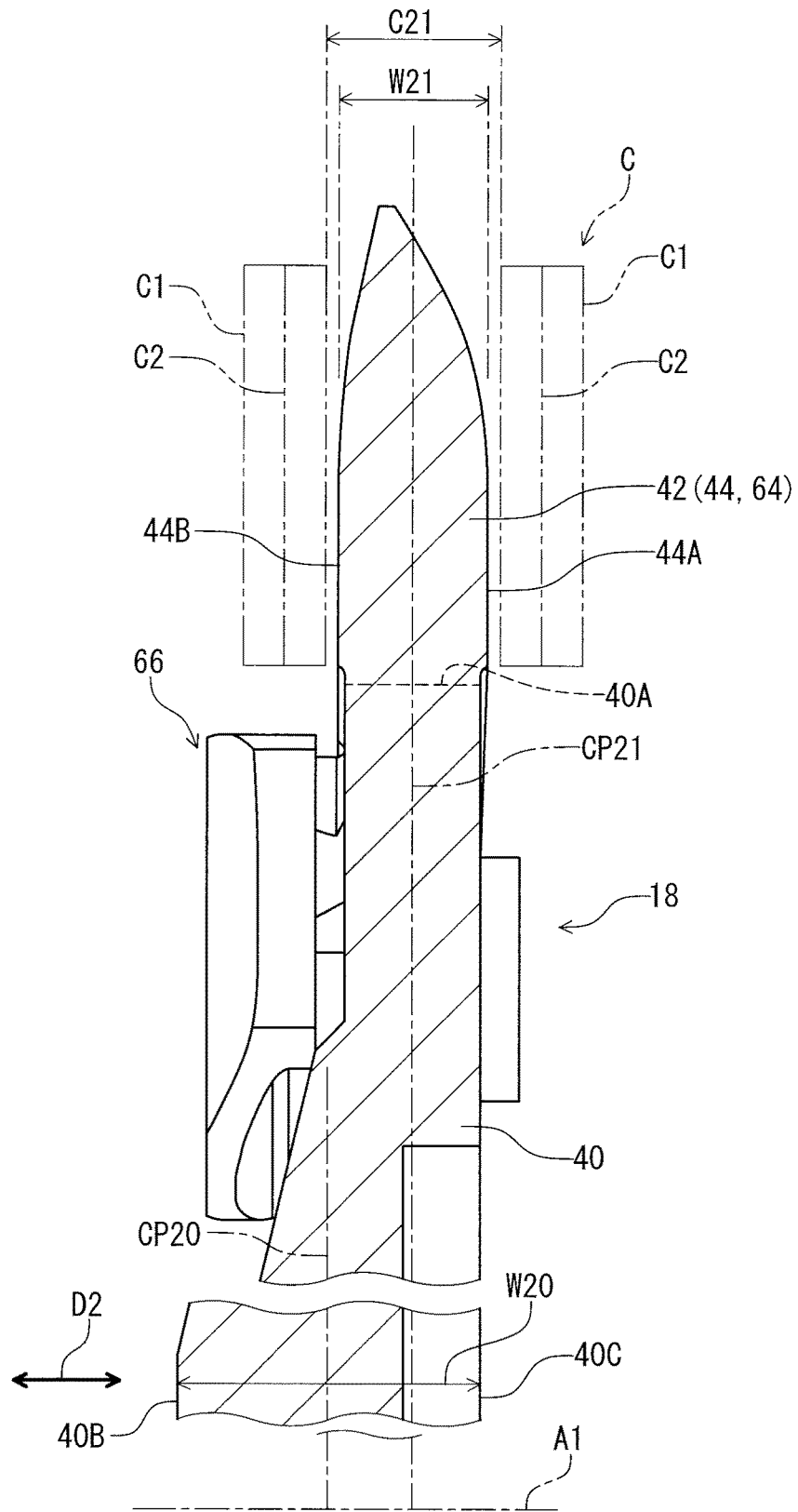
FIG. 9 is a cross-sectional view of the second sprocket taken along line IX-IX of FIG. 8.

As seen in FIGS. 8 and 9, the second sprocket 18 comprises a second sprocket body 40 and a plurality of second sprocket teeth 42. The second sprocket body 40 includes a second outer periphery 40A. The plurality of second sprocket teeth 42 is provided on the second outer periphery 40A. The plurality of second sprocket teeth 42 includes at least one second tooth 44 provided on the second outer periphery 40A to be engaged with the bicycle chain C. Specifically, the at least one second tooth 44 is provided on the second outer periphery 40A to be capable of being received in each of the outer link space C11 and the inner link space C21 defined between the pair of inner link plates C2 of the bicycle chain C. In this embodiment, the plurality of second teeth 44 is provided on the second outer periphery 40A to be capable of being received in each of the outer link space C11 and the inner link space C21. All the plurality of second sprocket teeth 42 are capable of being received in each of the outer link space C11 and the inner link space C21. All the plurality of second sprocket teeth 42 are configured to be received in each of the outer link space C11 and the inner link space C21. However, at least one of the plurality of second sprocket teeth 42 can be received in each of the outer link space C11 and the inner link space C21. In such an embodiment, the remaining of the plurality of second sprocket teeth 42 is configured to be received in only one of the outer link space C11 and the inner link space C21.

In this embodiment, as seen in FIGS. 5 and 8, a total number of the plurality of first sprocket teeth 34 is an even number, and a total number of the plurality of second sprocket teeth 42 is an even number. For example, the total number of the plurality of first sprocket teeth 34 is twenty-four, and the total number of the plurality of second sprocket teeth 42 is thirty-six. However, a total number of the plurality of first sprocket tooth 34 is not limited to this embodiment. A total number of the plurality of second sprocket tooth 42 is not limited to this embodiment. The total number of the plurality of second sprocket teeth 42 can be an odd number.

As seen in FIG. 9, the second sprocket body 40 has a second reference center plane CP20 perpendicular to the rotational center axis A1. The at least one second tooth 44 has a second maximum width W21 and a second tooth center plane CP21. The second maximum width W21 is defined in the axial direction D2. The second tooth center plane CP21 is defined to bisect the second maximum width W21 in the axial direction D2 and offset from the second reference center plane CP20 in the axial direction D2. However, the second tooth center plane CP21 of the at least one second tooth 44 can be disposed to coincide with the second reference center plane CP20 in the axial direction D2.

In this embodiment, the second sprocket 18 comprises an axial surface 40B and a reverse axial surface 40C. The axial surface 40B faces toward the first sprocket 16 in the axial direction D2 parallel to the rotational center axis A1. The reverse axial surface 40C is provided on a reverse side of the axial surface 40B in the axial direction D2. The axial surface 40B and the reverse axial surface 40C are defined on the second sprocket body 40. The second sprocket body 40 has a second body maximum width W20 defined between the axial surface 40B and the reverse axial surface 40C in the axial direction D2. The second reference center plane CP20 is defined to bisect the second body maximum width W20 in the axial direction D2. The axial surface 40B can also be referred to as a second axial surface 40B. The reverse axial surface 40C can also be referred to as a second reverse axial surface 40C.

Furthermore, the second tooth 44 includes a chain-engagement surface 44A and an additional chain-engagement surface 44B. The chain-engagement surface 44A faces in the axial direction D2 and is contactable with one of the pair of outer link plates C1 and one of the pair of inner link plates C2. The additional chain-engagement surface 44B faces in the axial direction D2 and is contactable with the other of the pair of outer link plates C1 and the other of the pair of inner link plates C2. The additional chain-engagement surface 44B is provided on a reverse side of the chain-engagement surface 44A in the axial direction D2. The second maximum width W21 is defined between the chain-engagement surface 44A and the additional chain-engagement surface 44B in the axial direction D2. The second maximum width W21 is smaller than the second body maximum width W20.

As seen in FIGS. 5 and 8, one of the first sprocket 16 and the second sprocket 18 has a pitch-circle diameter larger than a pitch-circle diameter of the other of the first sprocket 16 and the second sprocket 18. In this embodiment, the first sprocket 16 has a first pitch-circle diameter PCD1 defined by the plurality of first sprocket teeth 34. The second sprocket 18 has a second pitch-circle diameter PCD2 defined by the plurality of second sprocket teeth 42. The second pitch-circle diameter PCD2 is larger than the first pitch-circle diameter PCD1. However, the first pitch-circle diameter PCD1 can be larger than the second pitch-circle diameter PCD2.

The first pitch-circle diameter PCD1 can be defined based on centers C31 of pins C3 (FIGS. 10 and 12) of the bicycle chain C which is engaged with the plurality of first sprocket teeth 34. The second pitch-circle diameter PCD2 can be defined based on the centers C31 of the pins C3 (FIGS. 10 and 12) of the bicycle chain C which is engaged with the plurality of second sprocket teeth 42.

As seen in FIG. 8, the one of the first sprocket 16 and the second sprocket 18 comprises a first shifting facilitation area FA1 to facilitate a first shifting operation in which the bicycle chain C is shifted from the second sprocket 18 toward the first sprocket 16 in a first chain-phase state CS1 (FIG. 10) in which a reference tooth 45 of the plurality of second sprocket teeth 42 is received in the outer link space C11. The one of the first sprocket 16 and the second sprocket 18 comprises a second shifting facilitation area FA2 to facilitate a second shifting operation in which the bicycle chain C is shifted from the second sprocket 18 toward the first sprocket 16 in a second chain-phase state CS2 (FIG. 11) in which the reference tooth 45 of the plurality of second sprocket teeth 42 is received in the inner link space C21. The position of the reference tooth 45 is not limited to this embodiment. Another tooth of the second sprocket teeth 42 can be defined as the reference tooth 45.

Figure 10:
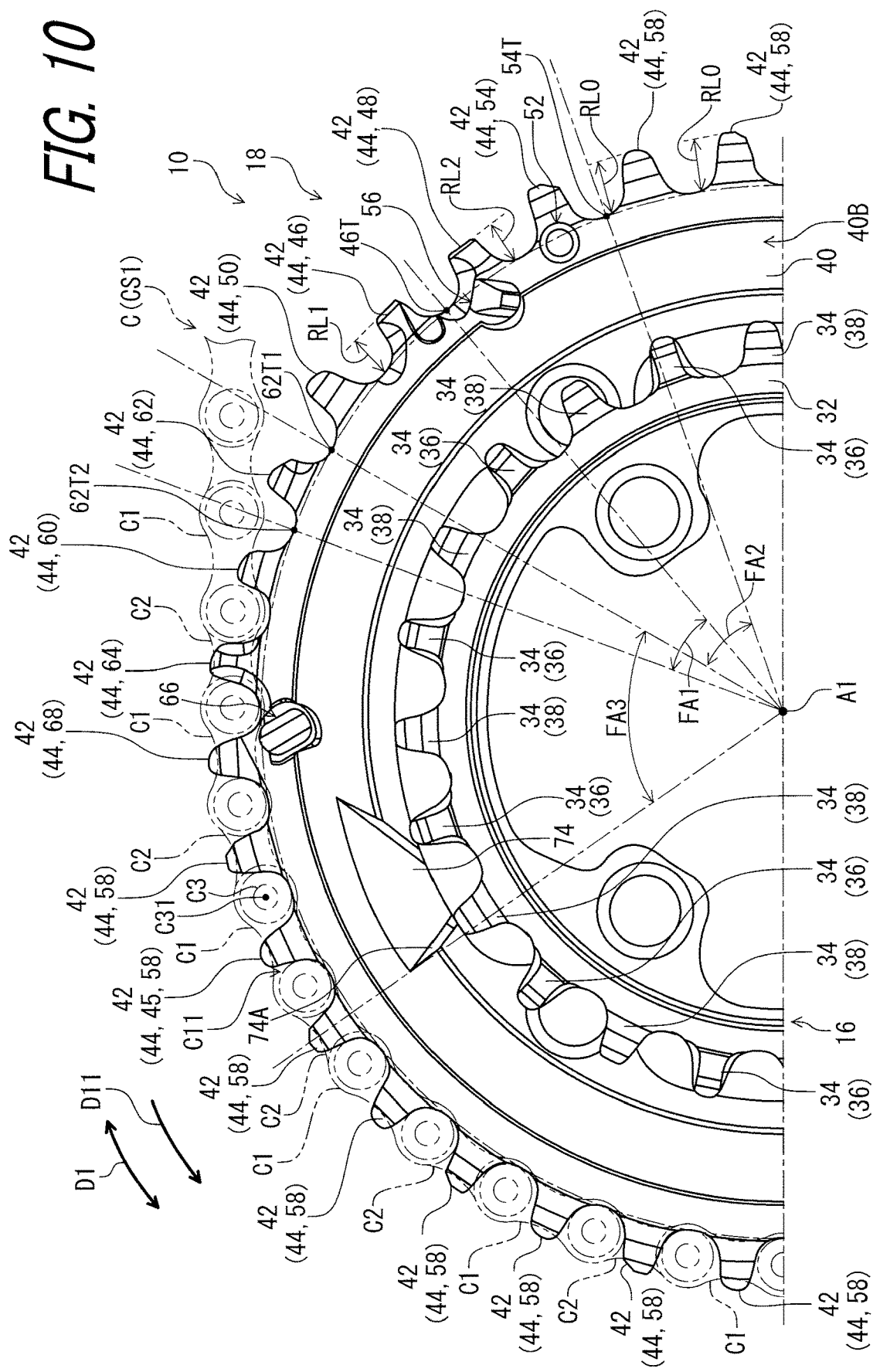
FIG. 10 is a partial side elevational view of the bicycle sprocket assembly illustrated in FIG. 3 with a bicycle chain (first chain-phase state).
Figure 11:
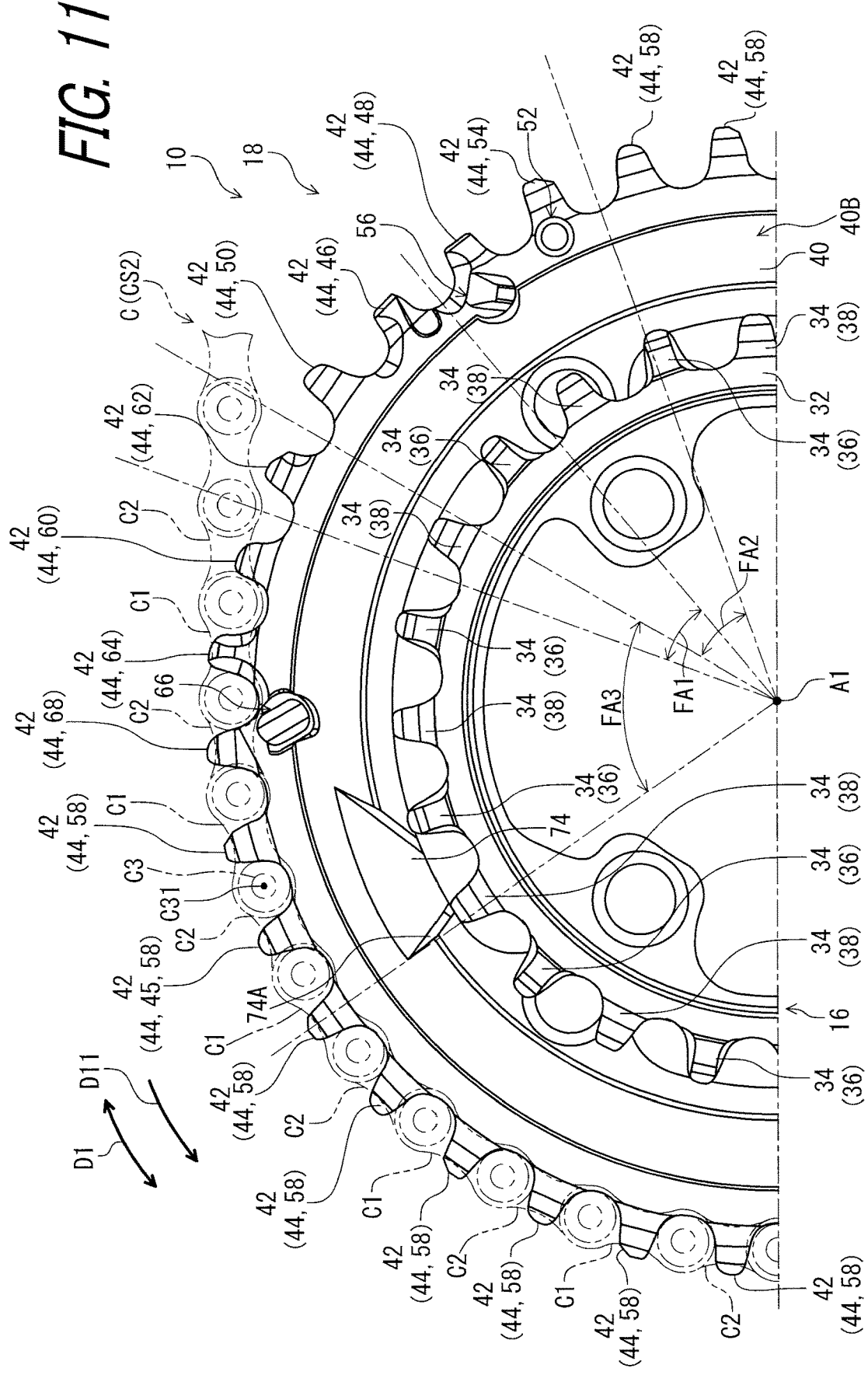
FIG. 11 is a partial side elevational view of the bicycle sprocket assembly illustrated in FIG. 3 with the bicycle chain (second chain-phase state).

In this embodiment, the second sprocket 18 comprises a pair of first shifting facilitation areas FA1 to facilitate the first shifting operation in which the bicycle chain C is shifted from the second sprocket 18 toward the first sprocket 16 in the first chain-phase state CS1 (FIG. 10). The second sprocket 18 comprises a pair of second shifting facilitation areas FA2 to facilitate the second shifting operation in which the bicycle chain C is shifted from the second sprocket 18 toward the first sprocket 16 in the second chain-phase state CS2 (FIG. 11). However, a total number of the first shifting facilitation areas FA1 is not limited to this embodiment. A total number of the second shifting facilitation areas FA2 is not limited to this embodiment.

In a case where the second pitch-circle diameter PCD2 is smaller than the first pitch-circle diameter PCD1, the first sprocket 16 can comprise the first shifting facilitation area FA1 to facilitate the first shifting operation in which the bicycle chain C is shifted from the second sprocket 18 toward the first sprocket 16 in the first chain-phase state CS1 (FIG. 10). Furthermore, the first sprocket 16 can comprise the second shifting facilitation area FA2 to facilitate the second shifting operation in which the bicycle chain C is shifted from the second sprocket 18 toward the first sprocket 16 in the second chain-phase state CS2 (FIG. 11).

Figure 12:
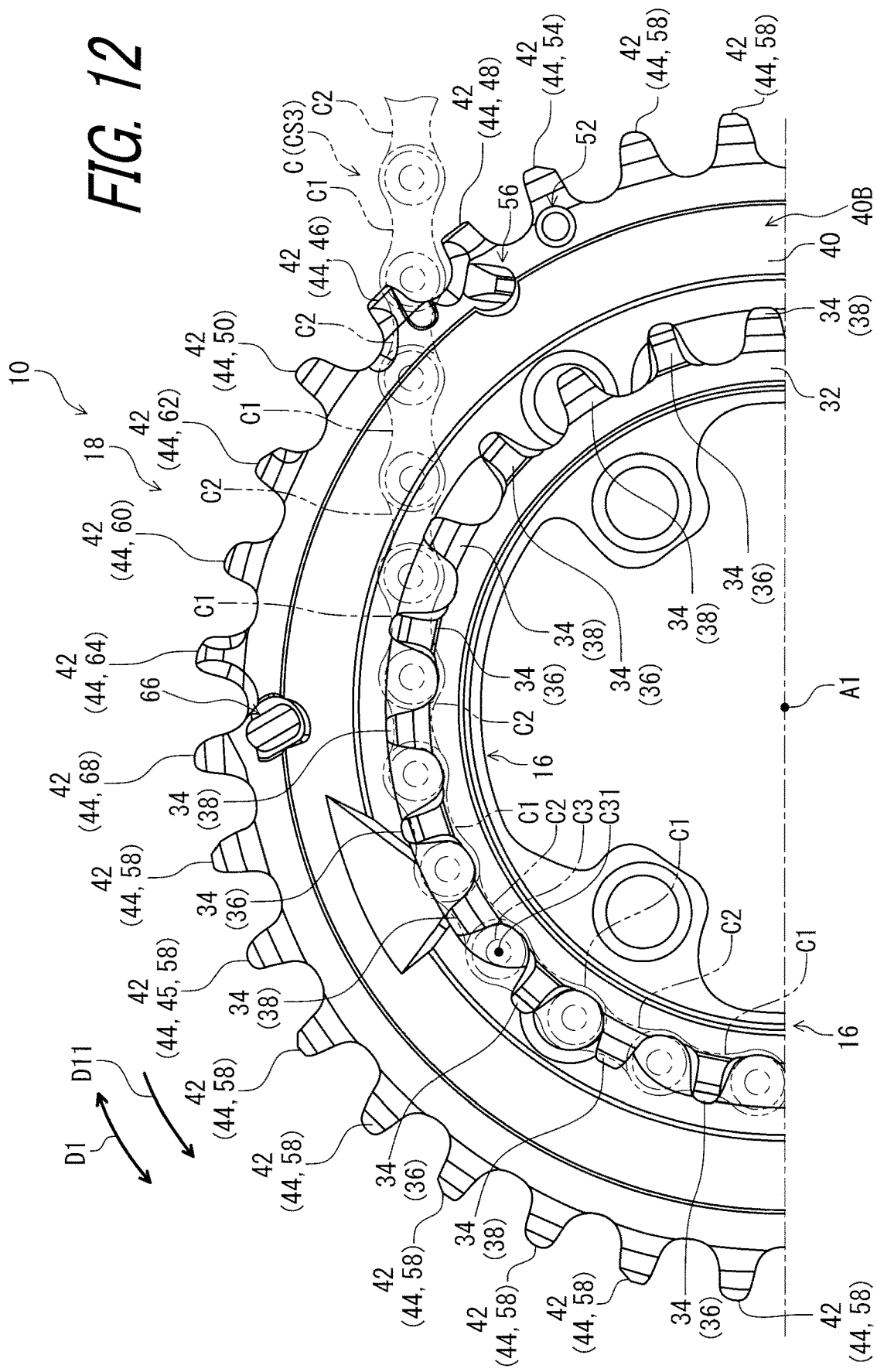
FIG. 12 is a partial side elevational view of the bicycle sprocket assembly illustrated in FIG. 3 with the bicycle chain (third chain-phase state).

As seen in FIG. 12, the first sprocket 16 has a third chain-phase state CS3 defined by a circumferential positional relationship among the at least one first tooth 36, the pair of outer link plates C1, and the pair of inner link plates C2. In the third chain-phase state CS3, the first tooth 36 is received in the outer link space C11, and the first additional tooth 38 is received in the inner link space C21. As seen in FIG. 10, the first sprocket 16 comprises a third shifting facilitation area FA3 to facilitate a third shifting operation in which the bicycle chain C is shifted from the first sprocket 16 to the second sprocket 18.

As seen in FIG. 8, the first shifting facilitation area FA1 at least partly overlaps with the second shifting facilitation area FA2 in the circumferential direction D1 defined about the rotational center axis A1. In this embodiment, the first shifting facilitation area FA1 partly overlaps with the second shifting facilitation area FA2 in the circumferential direction D1. The first shifting facilitation area FA1 is provided on a downstream side of the second shifting facilitation area FA2 in the driving rotational direction D11. However, the positional relationship between the first shifting facilitation area FA1 and the second shifting facilitation area FA2 is not limited to this embodiment. For example, the first shifting facilitation area FA1 can entirely overlap with the second shifting facilitation area FA2 in the circumferential direction D1. The first shifting facilitation area FA1 can be spaced apart from the second shifting facilitation area FA2 in the circumferential direction D1 without overlapping with the second shifting facilitation area FA2. The first shifting facilitation area FA1 can be provided on an upstream side of the second shifting facilitation area FA2 in the driving rotational direction D11.

As seen in FIG. 10, the at least one second tooth 44 includes a first derailing tooth 46 and a second derailing tooth 48. The first derailing tooth 46 is provided in the first shifting facilitation area FA1 to first derail the bicycle chain C from the second sprocket 18 in the first shifting operation. The second derailing tooth 48 is provided in the second shifting facilitation area FA2 to first derail the bicycle chain C from the second sprocket 18 in the second shifting operation. The first derailing tooth 46 is adjacent to the second derailing tooth 48 without another tooth between the first derailing tooth 46 and the second derailing tooth 48 in the circumferential direction D1 defined about the rotational center axis A1. However, another tooth can be provided between the first derailing tooth 46 and the second derailing tooth 48 in the circumferential direction D1.

Figure 13:
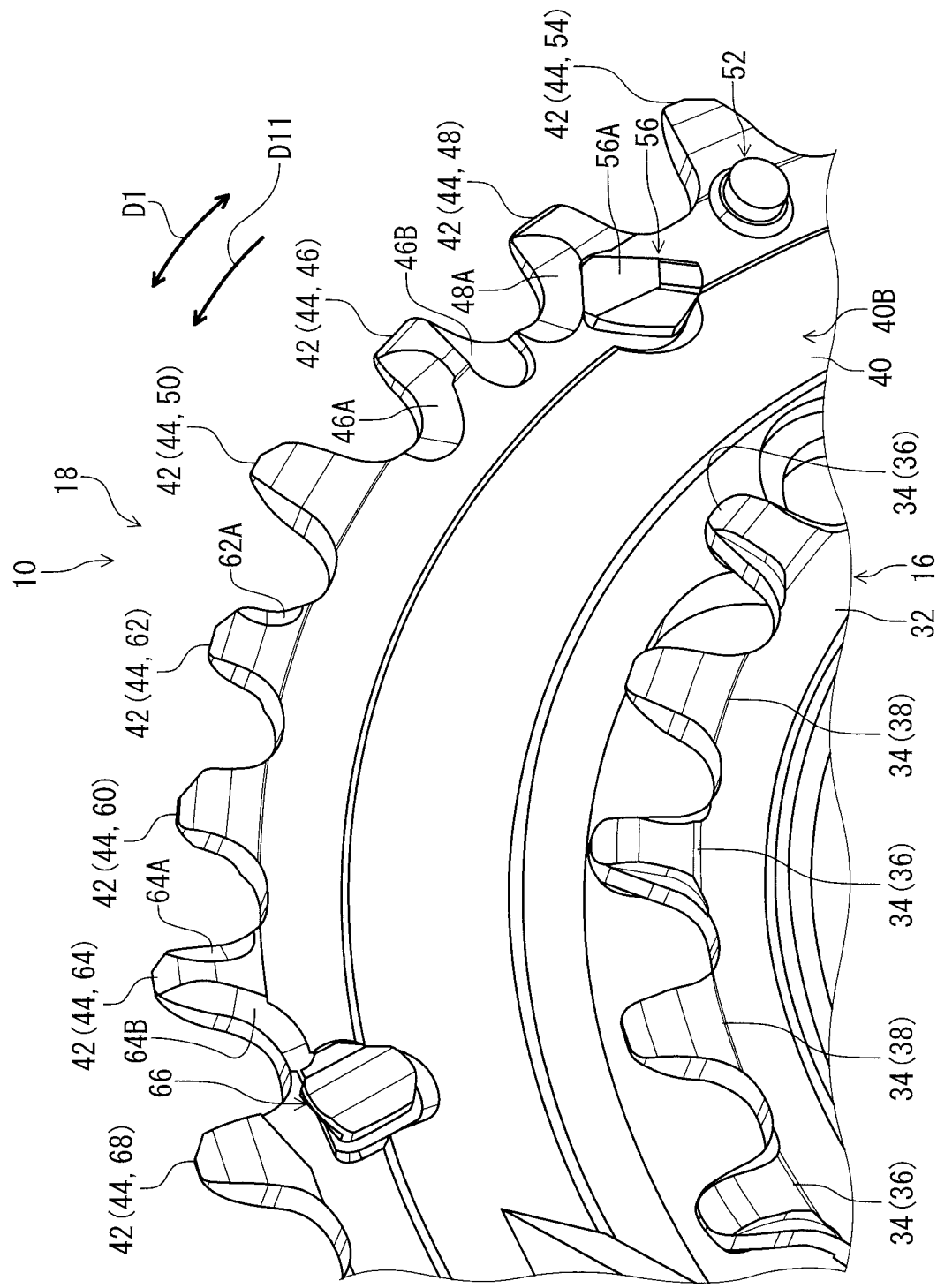
FIG. 13 is a partial perspective view of the bicycle sprocket assembly illustrated in FIG. 3.
Figure 14:
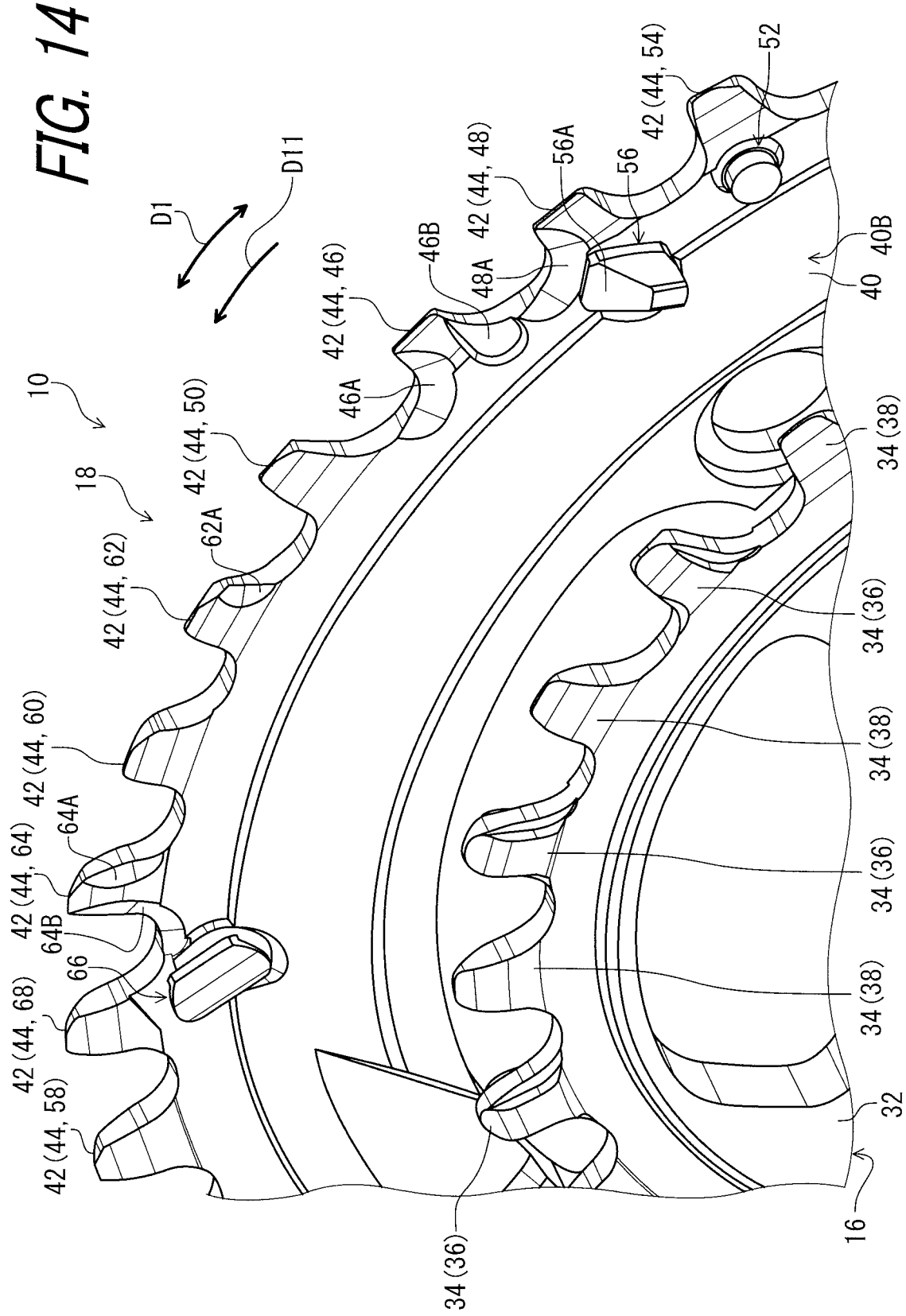
FIG. 14 is another partial perspective view of the bicycle sprocket assembly illustrated in FIG. 3.

As seen in FIGS. 13 and 14, the first derailing tooth 46 includes a first downstream chamfer 46A provided on the axial surface 40B. The first downstream chamfer 46A is provided on a downstream side in the first derailing tooth 46 in the driving rotational direction D11 in which the bicycle crank assembly 10 rotates about the rotational center axis A1 during pedaling. The first downstream chamfer 46A reduces interference between the first derailing tooth 46 and the bicycle chain C (e.g., the inner link plate C2) when the first derailing tooth 46 first derails the bicycle chain C from the second sprocket 18 in the first chain-phase state CS1. In other words, the first downstream chamfer 46A can guide the bicycle chain C to be derailed from the first derailing tooth 46 toward the first sprocket 16.

The second derailing tooth 48 includes a second downstream chamfer 48A provided on the axial surface 40B. The second downstream chamfer 48A is provided on a downstream side in the second derailing tooth 48 in the driving rotational direction D11 in which the bicycle crank assembly 10 rotates about the rotational center axis A1 during pedaling. The second downstream chamfer 48A reduces interference between the second derailing tooth 48 and the bicycle chain C (e.g., the inner link plate C2) when the second derailing tooth 48 first derails the bicycle chain C from the second sprocket 18 in the second chain-phase state CS2. In other words, the second downstream chamfer 48A can guide the bicycle chain C to be derailed from the second derailing tooth 48 toward the first sprocket 16.

The first derailing tooth 46 includes a first upstream chamfer 46B provided on the axial surface 40B. The first upstream chamfer 46B is provided on an upstream side in the first derailing tooth 46 in the driving rotational direction D11 in which the bicycle crank assembly 10 rotates about the rotational center axis A1 during pedaling. The first upstream chamfer 46B facilitates a bend of the bicycle chain C toward the first sprocket 16 in order to smoothly guide the bicycle chain C toward the first sprocket 16 in the first shifting operation.

Figure 15:
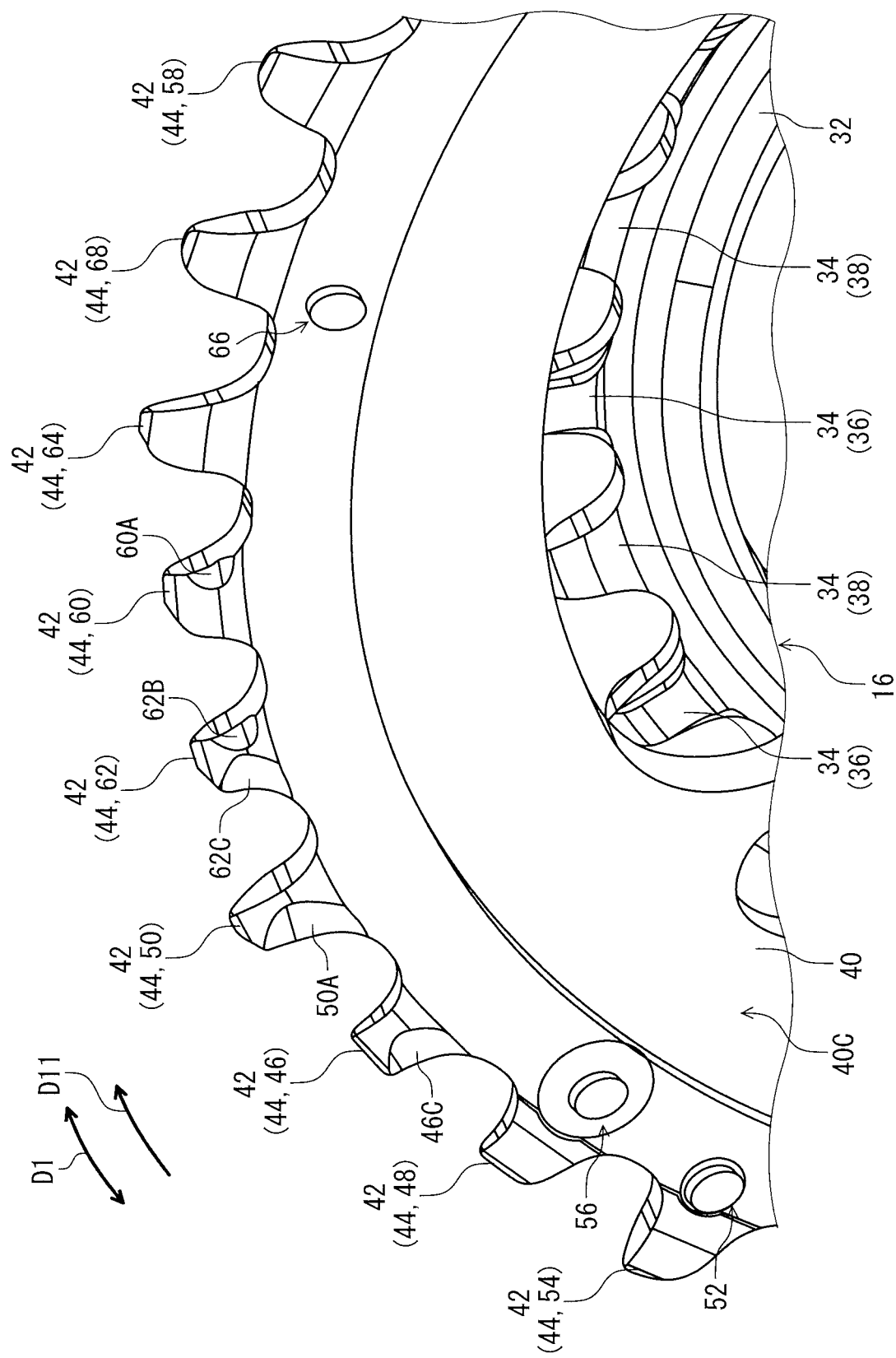
FIG. 15 is another partial perspective view of the bicycle sprocket assembly illustrated in FIG. 3.

As seen in FIG. 15, the first derailing tooth 46 includes a first reverse upstream chamfer 46C provided on the reverse axial surface 40C. The first reverse upstream chamfer 46C is provided on an upstream side in the first derailing tooth 46 in the driving rotational direction D11 in which the bicycle crank assembly 10 rotates about the rotational center axis A1 during pedaling. The first reverse upstream chamfer 46C reduces interference between the second derailing tooth 48 and the bicycle chain C (e.g., the inner link plate C2) when the second derailing tooth 48 first derails the bicycle chain C from the second sprocket 18 in the second chain-phase state CS2. In other words, the first reverse upstream chamfer 46C facilitates the bicycle chain C to be moved toward the first sprocket 16 in the second shifting operation.

In this embodiment, the first derailing tooth 46 includes the first downstream chamfer 46A, the first upstream chamfer 46B, and the first reverse upstream chamfer 46C. The second derailing tooth 48 includes the second downstream chamfer 48A. However, at least one of the first downstream chamfer 46A, the first upstream chamfer 46B, and the first reverse upstream chamfer 46C can be omitted from the first derailing tooth 46. The second downstream chamfer 48A can be omitted from the second derailing tooth 48.

As seen in FIG. 15, the at least one second tooth 44 includes a derailing facilitation tooth 50. The derailing facilitation tooth 50 is provided in the first shifting facilitation area FA1 to facilitate derailing of the bicycle chain C at the first derailing tooth 46 from the second sprocket 18 in the first shifting operation. The derailing facilitation tooth 50 is also provided in the second shifting facilitation area FA2 to facilitate derailing of the bicycle chain C at the second derailing tooth 48 from the second sprocket 18 in the second shifting operation. The derailing facilitation tooth 50 is provided on a downstream side of the first derailing tooth 46 in the driving rotational direction D11. The derailing facilitation tooth 50 is provided on a downstream side of the second derailing tooth 48 in the driving rotational direction D11. The derailing facilitation tooth 50 is adjacent to the first derailing tooth 46 without another tooth between the first derailing tooth 46 and the derailing facilitation tooth 50 in the circumferential direction D1. However, another tooth can be provided between the first derailing tooth 46 and the derailing facilitation tooth 50 in the circumferential direction D1.

The derailing facilitation tooth 50 includes a second reverse upstream chamfer 50A provided on the reverse axial surface 40C. The second reverse upstream chamfer 50A is provided on an upstream side in the derailing facilitation tooth 50 in the driving rotational direction D11. The second reverse upstream chamfer 50A reduces interference between the first derailing tooth 46 and the bicycle chain C (e.g., the inner link plate C2) when the first derailing tooth 46 first derails the bicycle chain C from the second sprocket 18 in the first shifting operation. In other words, the second reverse upstream chamfer 50A facilitates the bicycle chain C to be moved toward the first sprocket 16 during the first shifting operation. The second reverse upstream chamfer 50A also reduces interference between the second derailing tooth 48 and the bicycle chain C (e.g., the inner link plate C2) when the second derailing tooth 48 first derails the bicycle chain C from the second sprocket 18 in the second shifting operation. In other words, the second reverse upstream chamfer 50A facilitates the bicycle chain C to be moved toward the first sprocket 16 in the second shifting operation. However, the second reverse upstream chamfer 50A can be omitted from the derailing facilitation tooth 50.

As seen in FIGS. 10, 13, and 14, the second sprocket 18 comprises a shifting facilitation projection 52 provided in the second shifting facilitation area FA2 to facilitate the second shifting operation. The shifting facilitation projection 52 is provided on an upstream side of the second derailing tooth 48 in the driving rotational direction D11 in which the bicycle crank assembly 10 rotates about the rotational center axis A1 during pedaling. The shifting facilitation projection 52 projects from the axial surface 40B of the second sprocket body 40 in the axial direction D2 to contact the bicycle chain C (e.g., the inner link plate C2) in the second shifting operation.

The at least one second tooth 44 includes an adjacent tooth 54 closest to the shifting facilitation projection 52 among the at least one second tooth 44. The second derailing tooth 48 is adjacent to the adjacent tooth 54 without another tooth between the second derailing tooth 48 and the adjacent tooth 54 in the driving rotational direction D11. The second derailing tooth 48 is provided on a downstream side of the adjacent tooth 54 in the driving rotational direction D11. However, the positional relationship between the shifting facilitation projection 52 and the second derailing tooth 48 is not limited to this embodiment. In a case where the first sprocket 16 and the second sprocket 18 each have a predetermined total number of teeth, the positional relationship between the second derailing tooth 48 and the adjacent tooth 54 is not limited to this embodiment. In the case where the first sprocket 16 and the second sprocket 18 each have the predetermined total number of teeth, the shifting facilitation projection 52 can be omitted from the second sprocket 18.

Figure 16:
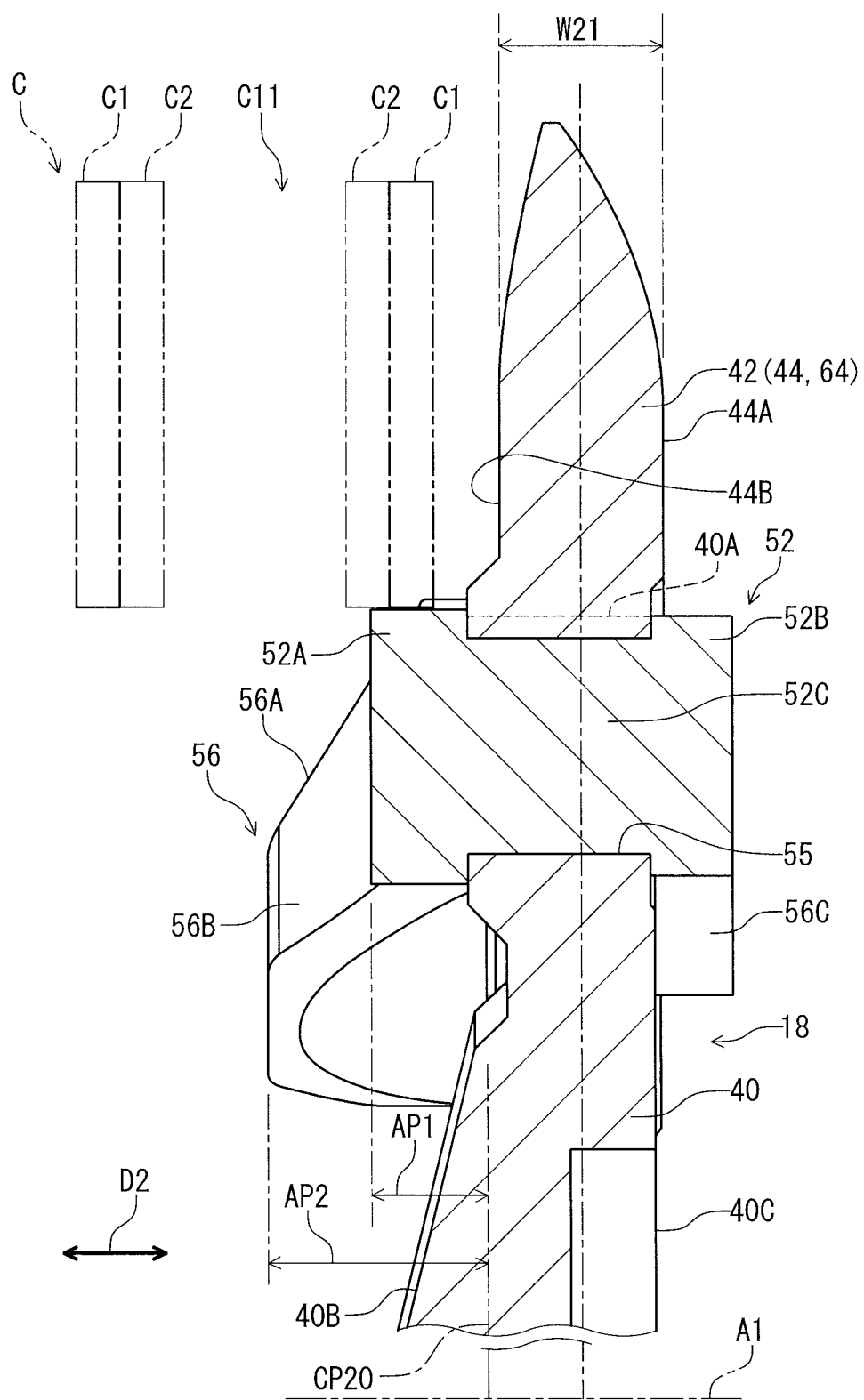
FIG. 16 is a cross-sectional view of the bicycle sprocket assembly taken along line XVI-XVI of FIG. 8.

As seen in FIG. 16, the shifting facilitation projection 52 is coupled to the second sprocket body 40 to contact the bicycle chain C (e.g., the outer link plate C1) in the second shifting operation. The shifting facilitation projection 52 is a separate member from the second sprocket body 40 and is secured to the second sprocket body 40. However, the shifting facilitation projection 52 can be integrally provided with the second sprocket body 40 as a one-piece unitary member.

In this embodiment, the shifting facilitation projection 52 includes a contact part 52A, a securing part 52B, and an intermediate part 52C. The contact part 52A is provided on the axial surface 40B to contact the outer link plate C1. The contact part 52A is provided at one end of the intermediate part 52C. The securing part 52B is provided on the reverse axial surface 40C. The securing part 52B is provided at the other end of the intermediate part 52C. The intermediate part 52C extends through a hole 55 of the second sprocket body 40. The contact part 52A has an outer diameter larger than an outer diameter of the intermediate part 52C. The securing part 52B has an outer diameter larger than the outer diameter of the intermediate part 52C. The contact part 52A, the securing part 52B, and the intermediate part 52C provide a rivet. However, the structure of the shifting facilitation projection 52 is not limited to this embodiment.

Figure 17:
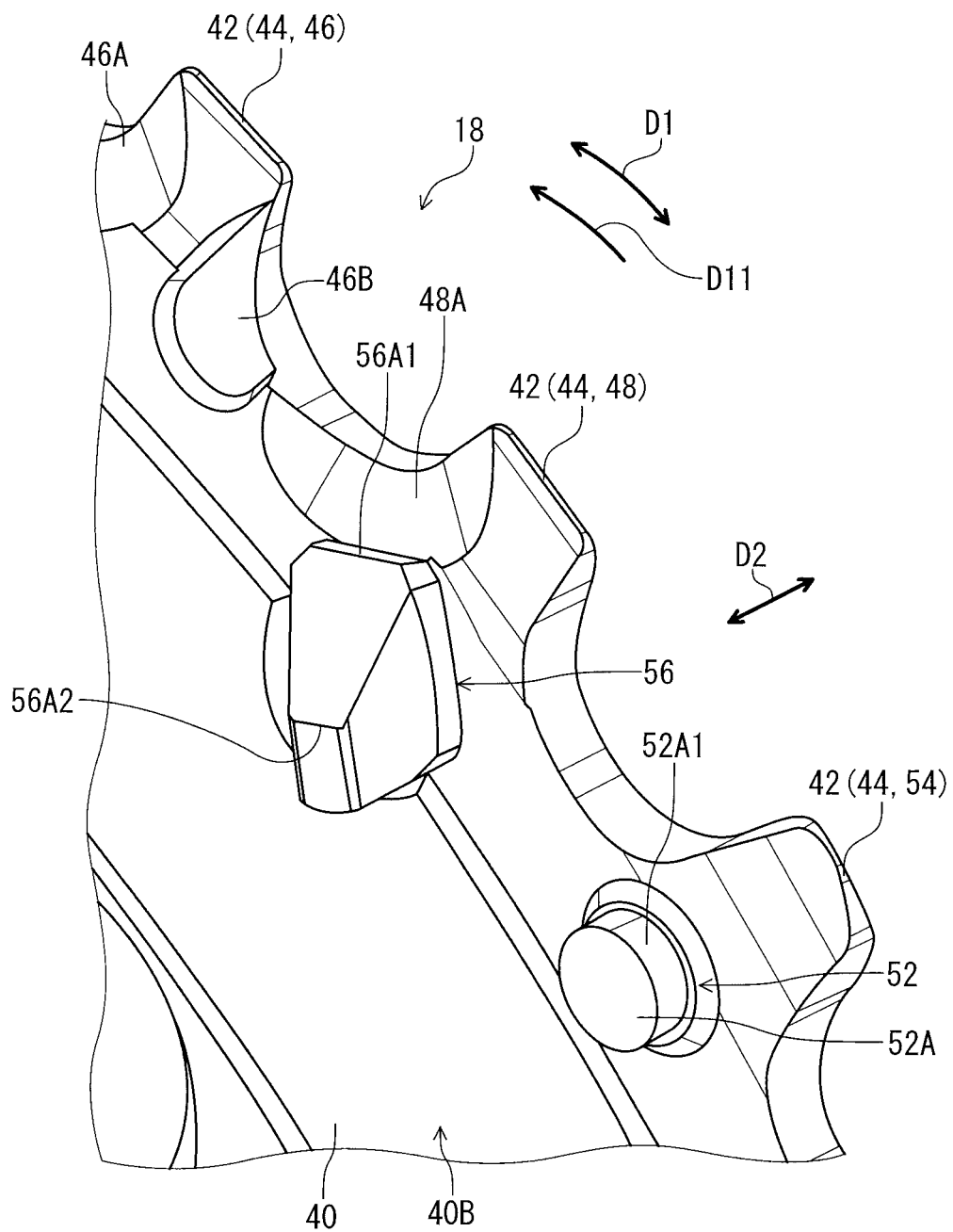
FIG. 17 is a partial perspective view of the second sprocket illustrated in FIG. 3.

As seen in FIG. 17, the contact part 52A has a curved surface 52A1 to contact the outer link plate C1 in the second shifting operation. Specifically, the contact part 52A has a columnar shape. The curved surface 52A1 is defined about the contact part 52A and has a circumferential round shape. However, the shape of the contact part 52A is not limited to this embodiment.

As seen in FIG. 10, the second sprocket 18 comprises a bump portion 56 provided in the second shifting facilitation area FA2 to restrict engagement of the shifting facilitation projection 52 with the bicycle chain C in the first shifting operation. The bump portion 56 is provided on a downstream side of the shifting facilitation projection 52 in the driving rotational direction D11 in which the bicycle crank assembly 10 rotates about the rotational center axis A1 during pedaling. The bump portion 56 projects from the axial surface 40B of the second sprocket body 40 in the axial direction D2 to contact the bicycle chain C (e.g., the outer link plate C1) in the first shifting operation to guide the bicycle chain C toward the first sprocket 16 in order to prevent the bicycle chain C from engaging with the shifting facilitation projection 52 after the bicycle chain C is derailed from the first derailing tooth 46. The second derailing tooth 48 is closest to the bump portion 56 among the at least one second tooth 44. The bump portion 56 is disposed on a radially inward side of the second derailing tooth 48. However, the arrangement of the bump portion 56 is not limited to this embodiment. The bump portion 56 can be omitted from the second sprocket 18.

The bump portion 56 is coupled to the second sprocket body 40 to contact the bicycle chain C (e.g., the inner link plate C2) in the first shifting operation. The bump portion 56 is a separate member from the second sprocket body 40 and is secured to the second sprocket body 40. However, the bump portion 56 can be integrally provided with the second sprocket body 40 as a one-piece unitary member.

Figure 18:
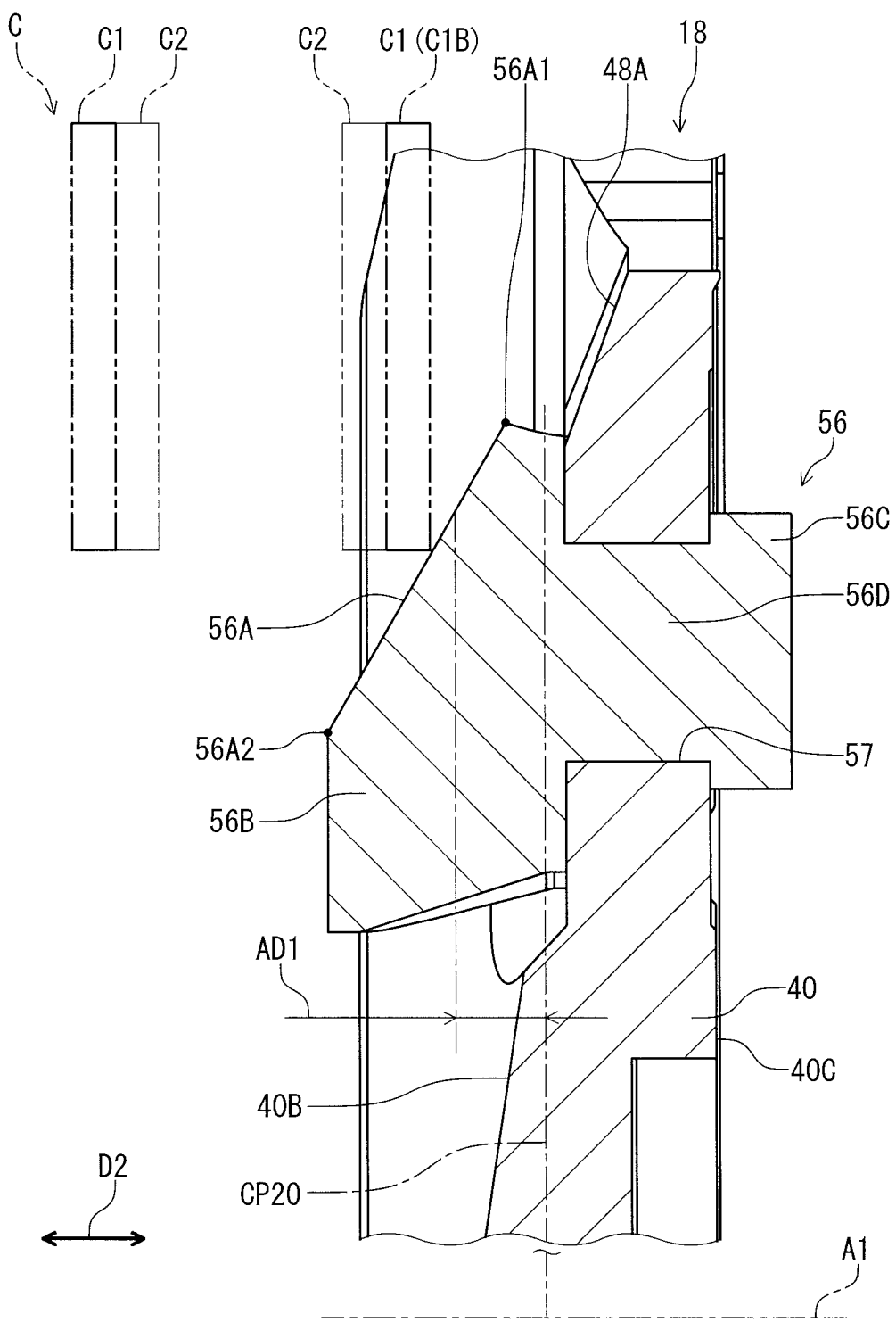
FIG. 18 is a cross-sectional view of the bicycle sprocket assembly taken along line XVIII-XVIII of FIG. 8.

As seen in FIGS. 17 and 18, the bump portion 56 includes a guide surface 56A to guide the bicycle chain C toward the first sprocket 16 in the axial direction D2 parallel to the rotational center axis A1 in the second shifting operation. As seen in FIG. 17, the guide surface 56A includes a first edge 56A1 and a second edge 56A2 opposite to the first edge 56A1. The first edge 56A1 is closest to the second derailing tooth 48 in the guide surface 56A in the axial direction D2. The second edge 56A2 is farther from the second derailing tooth 48 in the guide surface 56A in the axial direction D2. The second edge 56A2 is shorter than the first edge 56A1.

As seen in FIG. 18, the guide surface 56A is a flat surface and is inclined relative to the second reference center plane CP20. Specifically, an axial distance AD1 defined between the guide surface 56A and the second reference center plane CP20 increases from a radially outer part (e.g., the first edge 56A1) of the guide surface 56A to a radially inner part (e.g., the second edge 56A2) of the guide surface 56A. In this embodiment, the bump portion 56 includes a contact part 56B, a securing part 56C, and an intermediate part 56D. The contact part 56B is provided on the axial surface 40B to contact the outer link plate C1. The contact part 56B is provided at one end of the intermediate part 56D. The contact part 56B includes the guide surface 56A. The securing part 56C is provided on the reverse axial surface 40C. The securing part 56C is provided at the other end of the intermediate part 56D. The intermediate part 56D extends through a hole 57 of the second sprocket body 40. The contact part 56B has an outer diameter larger than an outer diameter of the intermediate part 56D. The securing part 56C has an outer diameter larger than the outer diameter of the intermediate part 56D. The contact part 56B, the securing part 56C, and the intermediate part 56D provide a rivet. As seen in FIG. 17, the contact part 56B has a shape different from a shape of the contact part 52A. However, the structure of the bump portion 56 is not limited to this embodiment.

As seen in FIG. 16, the shifting facilitation projection 52 has a first amount of projection AP1 defined from the second sprocket body 40 in the axial direction D2 parallel to the rotational center axis A1. The bump portion 56 has a second amount of projection AP2 defined from the second sprocket body 40 in the axial direction D2. The second amount of projection AP2 is larger than the first amount of projection AP1. However, the second amount of projection AP2 can be equal to or smaller than the first amount of projection AP1. In this embodiment, the first amount of projection AP1 and the second amount of projection AP2 are defined from the second reference center plane CP20 of the second sprocket body 40 in the axial direction D2.

As seen in FIG. 10, the at least one second tooth 44 includes at least one chain-driving tooth 58 provided outside the first shifting facilitation area FA1 and the second shifting facilitation area FA2. The at least one chain-driving tooth 58 has a reference radial length RL0 defined radially outward from the second outer periphery 40A. The first derailing tooth 46 has a first radial length RL1 defined radially outward from the second outer periphery 40A. The first radial length RL1 is shorter than the reference radial length RL0. The second derailing tooth 48 has a second radial length RL2 defined radially outward from the second outer periphery 40A. The second radial length RL2 is shorter than the reference radial length RL0. The second radial length RL2 is equal to the first radial length RL1. However, the first radial length RL1 can be equal to or longer than the reference radial length RL0. The second radial length RL2 can be equal to or longer than the reference radial length RL0. The second radial length RL2 can be equal to or longer than the first radial length RL1.

As seen in FIGS. 13 and 14, the plurality of second teeth 44 includes an outer-link receiving tooth 60 and an inner-link receiving tooth 62. The outer-link receiving tooth 60 is provided in a third shifting facilitation area FA3 to first receive the pair of outer link plates C1 of the bicycle chain C in the third shifting operation in which the bicycle chain C is shifted from the first sprocket 16 to the second sprocket 18. The inner-link receiving tooth 62 is provided in the third shifting facilitation area FA3 to first receive the pair of inner link plates C2 of the bicycle chain C in the third shifting operation. Furthermore, the inner-link receiving tooth 62 is provided in the first shifting facilitation area FA1 to facilitate derailing of the bicycle chain C at the first derailing tooth 46 from the second sprocket 18 in the first shifting operation.

The inner-link receiving tooth 62 is adjacent to the derailing facilitation tooth 50 without another tooth between the derailing facilitation tooth 50 and the inner-link receiving tooth 62 in the circumferential direction D1. The outer-link receiving tooth 60 is adjacent to the inner-link receiving tooth 62 without another tooth between the outer-link receiving tooth 60 and the inner-link receiving tooth 62 in the circumferential direction D1.

As seen in FIGS. 13 and 14, the inner-link receiving tooth 62 includes an inner-link upstream chamfer 62A provided on the axial surface 40B. The inner-link upstream chamfer 62A is provided on an upstream side in the inner-link receiving tooth 62 in the driving rotational direction D11. The inner-link upstream chamfer 62A reduces interference between the inner-link receiving tooth 62 and the bicycle chain C (e.g., the inner link plate C2) when the inner-link receiving tooth 62 first receives the pair of inner link plates C2 in the third shifting operation.

The inner-link receiving tooth 62 includes an inner-link downstream chamfer 62B provided on the reverse axial surface 40C. The inner-link downstream chamfer 62B is provided on a downstream side in the inner-link receiving tooth 62 in the driving rotational direction D11. The inner-link downstream chamfer 62B reduces interference between the inner-link receiving tooth 62 and the bicycle chain C (e.g., the inner link plate C2) when the inner-link receiving tooth 62 first receives the pair of inner link plates C2 in the third shifting operation.

As seen in FIG. 15, the inner-link receiving tooth 62 includes an inner-link reverse upstream chamfer 62C provided on the reverse axial surface 40C. The inner-link reverse upstream chamfer 62C is provided on an upstream side in the inner-link receiving tooth 62 in the driving rotational direction D11. The inner-link reverse upstream chamfer 62C reduces interference between the first derailing tooth 46 and the bicycle chain C (e.g., the outer link plate C1) when the first derailing tooth 46 first derails the bicycle chain C from the second sprocket 18 in the first chain-phase state CS1. In other words, the inner-link reverse upstream chamfer 62C facilitates the bicycle chain C to be moved toward the first sprocket 16 during the first shifting operation.

In this embodiment, the inner-link receiving tooth 62 includes the inner-link upstream chamfer 62A, the inner-link downstream chamfer 62B, and the inner-link reverse upstream chamfer 62C. However, at least one of the inner-link upstream chamfer 62A, the inner-link downstream chamfer 62B, and the inner-link reverse upstream chamfer 62C can be omitted from the inner-link receiving tooth 62.

The outer-link receiving tooth 60 includes an outer-link downstream chamfer 60A provided on the reverse axial surface 40C. The outer-link downstream chamfer 60A is provided on a downstream side in the outer-link receiving tooth 60 in the driving rotational direction D11. The outer-link downstream chamfer 60A reduces interference between the outer-link receiving tooth 60 and the bicycle chain C (one of the outer link plates C1) when the outer-link receiving tooth 60 first receives the pair of outer link plates C1 in the third shifting operation. However, the outer-link downstream chamfer 60A can be omitted from the outer-link receiving tooth 60.

As seen in FIGS. 13 and 14, the plurality of second teeth 44 includes a receiving facilitation tooth 64. The receiving facilitation tooth 64 is provided in the third shifting facilitation area FA3 to facilitate receiving of the bicycle chain C at the outer-link receiving tooth 60 and the inner-link receiving tooth 62 in the third shifting operation. The receiving facilitation tooth 64 is adjacent to the outer-link receiving tooth 60 without another tooth between the outer-link receiving tooth 60 and the receiving facilitation tooth 64 in the circumferential direction D1.

The receiving facilitation tooth 64 includes an upstream facilitation chamfer 64A and a downstream facilitation chamfer 64B. The upstream facilitation chamfer 64A is provided on an upstream side in the receiving facilitation tooth 64 in the driving rotational direction D11. The downstream facilitation chamfer 64B is provided on a downstream side in the receiving facilitation tooth 64 in the driving rotational direction D11. The upstream facilitation chamfer 64A is provided on the axial surface 40B to reduce interference between the outer-link receiving tooth 60 and the bicycle chain C (the outer link plate C1) in the third shifting operation. The downstream facilitation chamfer 64B is provided on the axial surface 40B to reduce interference between the receiving facilitation tooth 64 and the bicycle chain C (the outer link plate C1) in the third shifting operation.

As seen in FIG. 10, the second sprocket 18 comprises an additional shifting facilitation projection 66 provided in the third shifting facilitation area FA3 to facilitate the third shifting operation. The additional shifting facilitation projection 66 is provided on a downstream side of the outer-link receiving tooth 60, the inner-link receiving tooth 62, and the receiving facilitation tooth 64 in the driving rotational direction D11. The additional shifting facilitation projection 66 projects from the axial surface 40B of the second sprocket body 40 in the axial direction D2 to contact the bicycle chain C (e.g., the outer link plate C1) in the third shifting operation.

The at least one second tooth 44 includes an additional adjacent tooth 68 closest to the additional shifting facilitation projection 66 among the at least one second tooth 44. The receiving facilitation tooth 64 is adjacent to the additional adjacent tooth 68 without another tooth between the receiving facilitation tooth 64 and the additional adjacent tooth 68 in the driving rotational direction D11. However, the positional relationship between the additional shifting facilitation projection 66 and the receiving facilitation tooth 64 is not limited to this embodiment.

Figure 19:
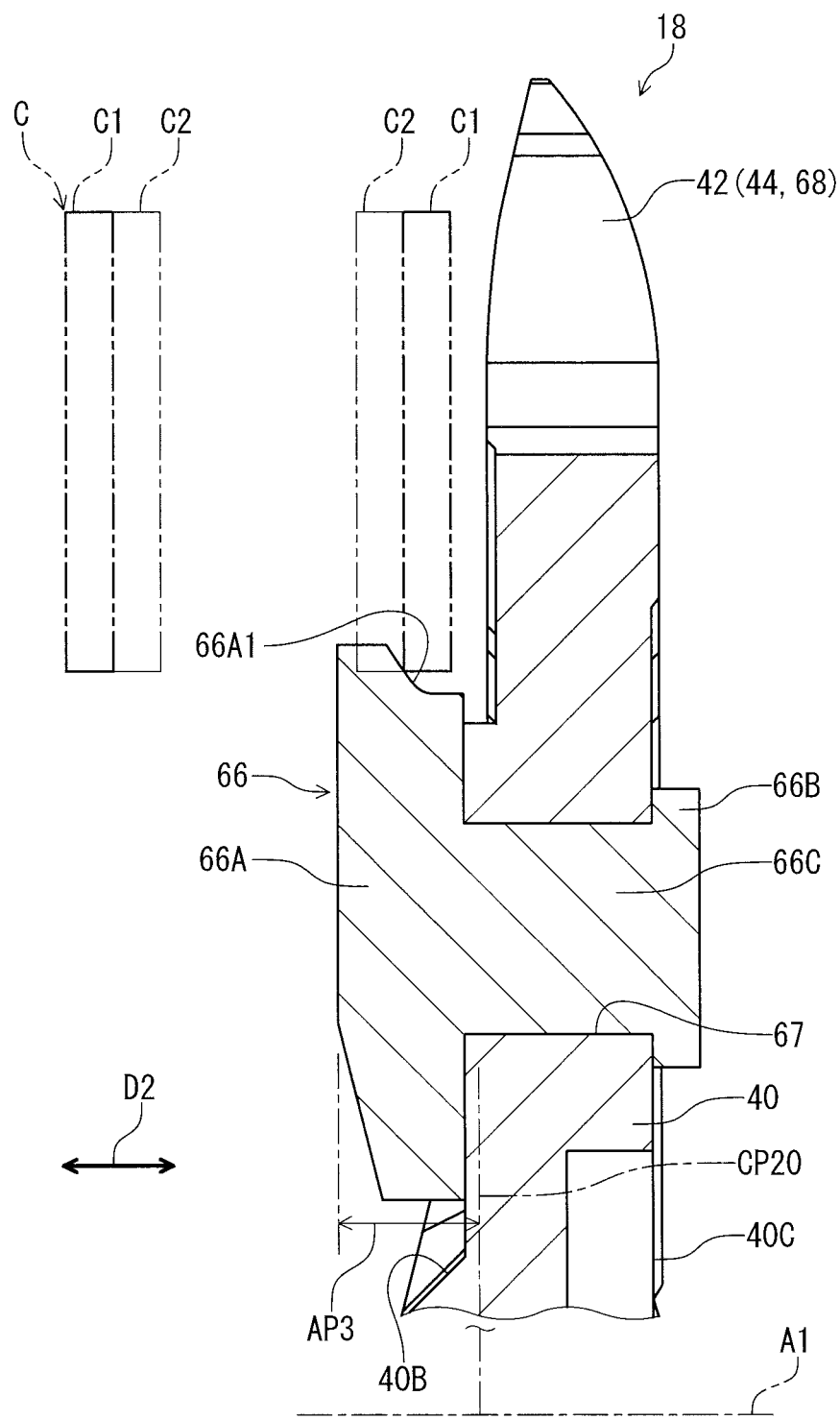
FIG. 19 is a cross-sectional view of the bicycle sprocket assembly taken along line XIX-XIX of FIG. 8.

As seen in FIG. 19, the additional shifting facilitation projection 66 is coupled to the second sprocket body 40 to contact the bicycle chain C (e.g., the outer link plate C1) in the third shifting operation. The additional shifting facilitation projection 66 is a separate member from the second sprocket body 40 and is secured to the second sprocket body 40. However, the additional shifting facilitation projection 66 can be integrally provided with the second sprocket body 40 as a one-piece unitary member.

The additional shifting facilitation projection 66 includes a contact part 66A, a securing part 66B, and an intermediate part 66C. The contact part 66A is provided on the axial surface 40B to contact the outer link plate C1. The contact part 66A is provided at one end of the intermediate part 66C. The securing part 66B is provided on the reverse axial surface 40C. The securing part 66B is provided at the other end of the intermediate part 66C. The intermediate part 66C extends through a hole 67 of the second sprocket body 40. The contact part 66A has an outer diameter larger than an outer diameter of the intermediate part 66C. The securing part 66B has an outer diameter larger than the outer diameter of the intermediate part 66C. The contact part 66A, the securing part 66B, and the intermediate part 66C provide a rivet. The additional shifting facilitation projection 66 can be omitted from the second sprocket 18.

Figure 20:
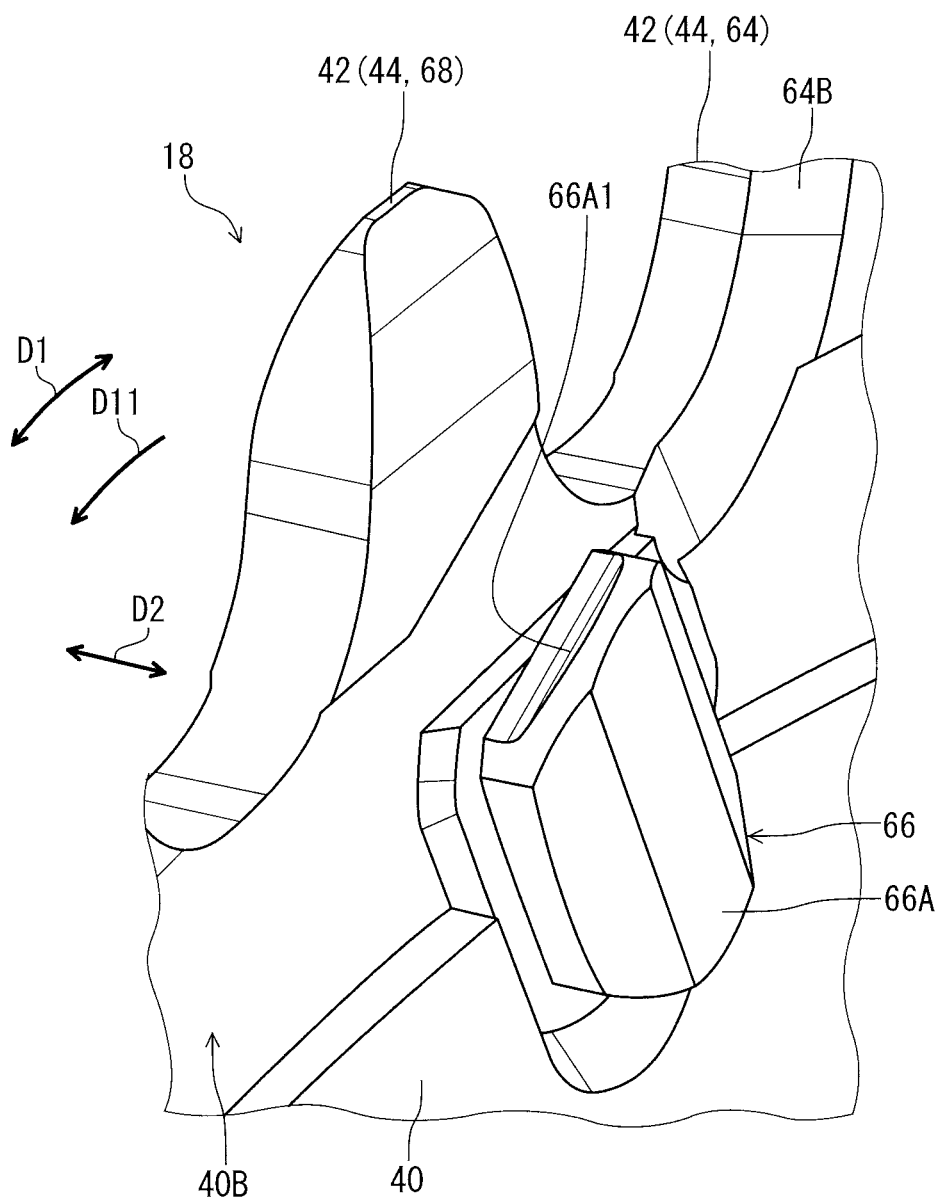
FIG. 20 is a partial perspective view of the second sprocket illustrated in FIG. 3.

As seen in FIGS. 19 and 20, the contact part 66A has a contact surface 66A1 to contact the outer link plate C1 of the bicycle chain C in the third shifting operation. The contact surface 66A1 guides the pair of outer link plates C1 toward the additional adjacent tooth 68 in the axial direction D2.

As seen in FIG. 19, the additional shifting facilitation projection 66 has a third amount of projection AP3 defined from the second sprocket body 40 in the axial direction D2. The third amount of projection AP3 is smaller than the second amount of projection AP2 and is substantially equal to the first amount of projection AP1. However, the third amount of projection AP3 can be equal to or larger than the second amount of projection AP2. In this embodiment, the third amount of projection AP3 is defined from the second reference center plane CP20 of the second sprocket body 40 in the axial direction D2.

As seen in FIG. 10, the first sprocket body 32 includes a shifting facilitation recess 74 provided in the third shifting facilitation area FA3 to facilitate the third shifting operation. Specifically, the shifting facilitation recess 74 is provided on the first axial surface 32B to reduce interference between the first sprocket body 32 and the bicycle chain C in the third shifting operation.

In this embodiment, as seen in FIG. 10, the first shifting facilitation area FA1 is defined from a downstream tooth bottom 62T2 of the inner-link receiving tooth 62 to an upstream tooth bottom 46T of the first derailing tooth 46 in the circumferential direction D1. The second shifting facilitation area FA2 is defined from an upstream tooth bottom 62T1 of the inner-link receiving tooth 62 to the upstream tooth bottom 54T of the adjacent tooth 54 in the circumferential direction D1. The third shifting facilitation area FA3 is defined from a downstream circumferential end 74A of the shifting facilitation recess 74 to the upstream tooth bottom 62T1 of the inner-link receiving tooth 62 in the circumferential direction D1. However, the first shifting facilitation area FA1, the second shifting facilitation area FA2, and the third shifting facilitation area FA3 are not limited to this embodiment.

The first shifting operation, the second shifting operation, and the third shifting operation will be described in detail below referring to FIGS. 21 to 25.

Figure 21:
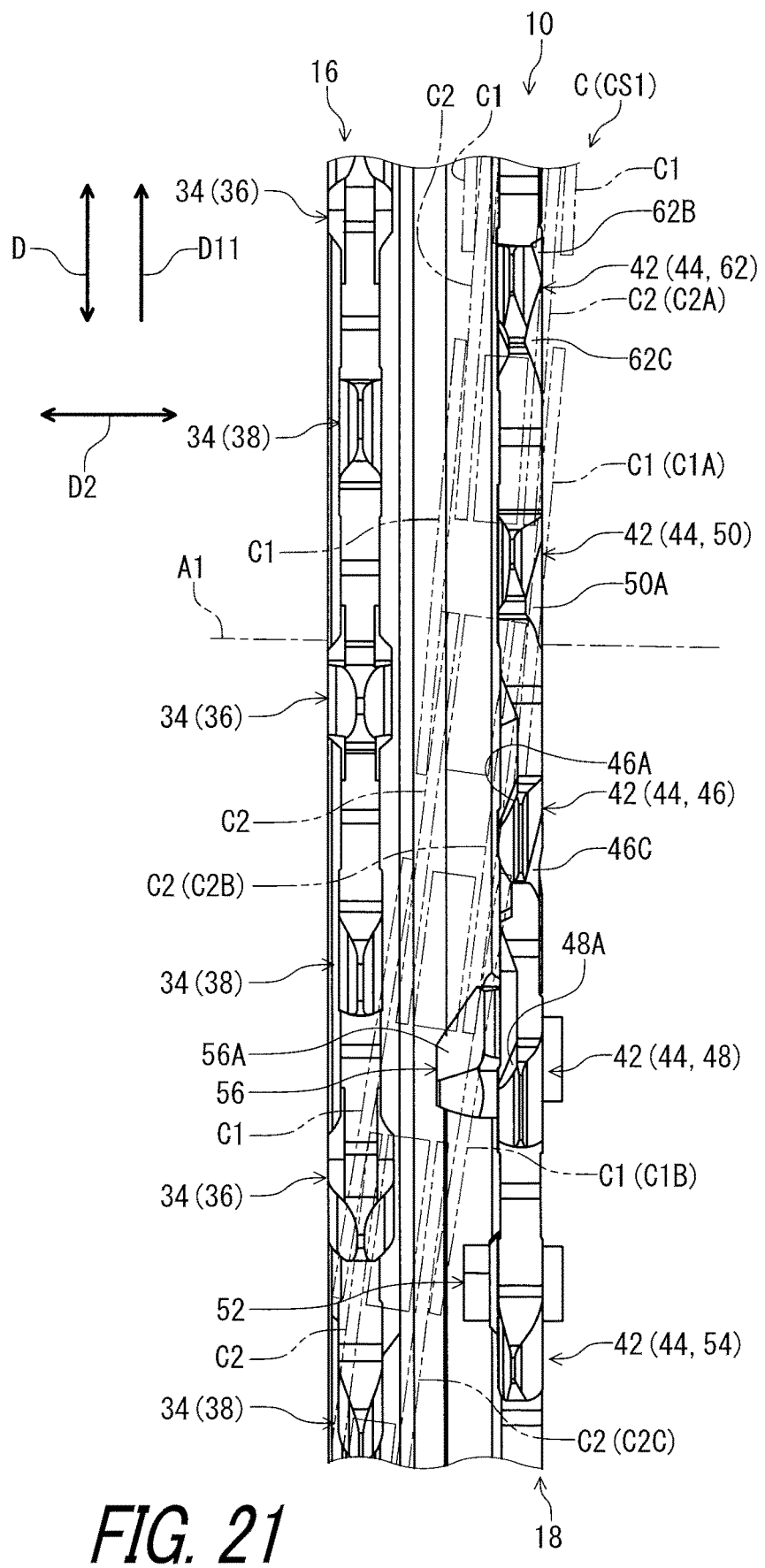
FIG. 21 is a plan view of the bicycle sprocket assembly illustrated in FIG. 3 with the bicycle chain (first shifting operation).

As seen in FIG. 21, the bicycle chain C is shifted from the second sprocket 18 toward the first sprocket 16 by the front derailleur (not shown) in the first shifting operation (in the first chain-phase state CS1). The inner-link reverse upstream chamfer 62C facilitates an inclination of the inner link plate C2A toward the first sprocket 16 relative to the axial direction D2. The second reverse upstream chamfer 50A facilitates an inclination of the outer link plates C1A toward the first sprocket 16 relative to the axial direction D2. Furthermore, the first downstream chamfer 46A guides the inner link plate C2B toward the first sprocket 16 in the axial direction D2. Thus, the bicycle chain C is first derailed from the second sprocket 18 at the first derailing tooth 46 in the first shifting operation.

Figure 22:
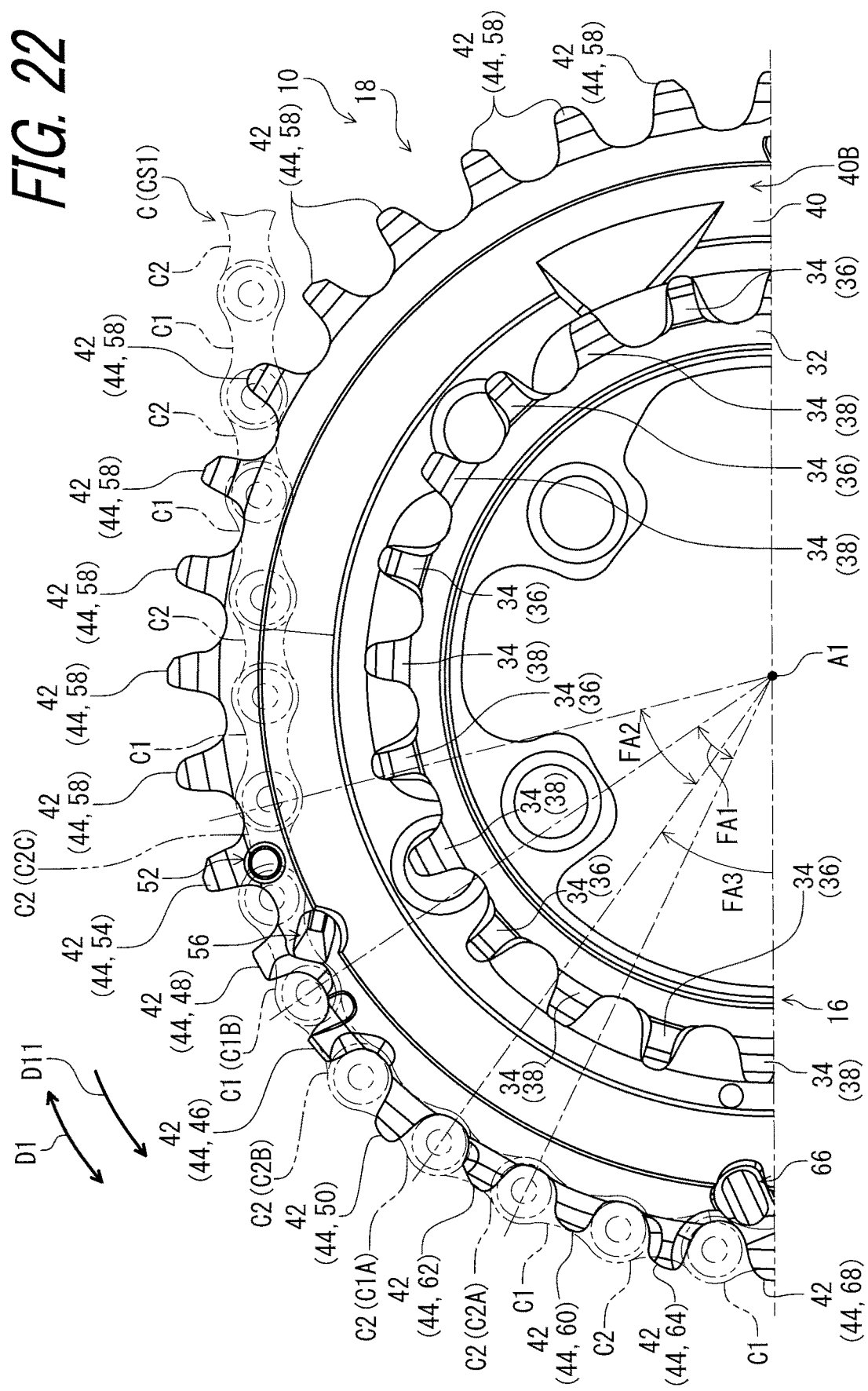
FIG. 22 is a partial side elevational view of the bicycle sprocket assembly illustrated in FIG. 3 with the bicycle chain (first shifting operation).

As seen in FIGS. 18 and 21, the outer link plate C1B is guided by the guide surface 56A of the bump portion 56 toward the first sprocket 16. As seen in FIG. 21, this moves the inner link plate C2C away from the shifting facilitation projection 52 in the axial direction D2. Thus, as seen in FIG. 22, the bicycle chain C extends from the first derailing tooth 46 viewed from the axial direction D2. This easily brings the bicycle chain C into engagement with the first sprocket teeth 34 when the bicycle chain C is in the first chain-phase state CS1. Accordingly, the first shifting facilitation area FA1 facilitates the first shifting operation in which the bicycle chain C is shifted from the second sprocket 18 toward the first sprocket 16 in the first chain-phase state CS1.

Figure 23:
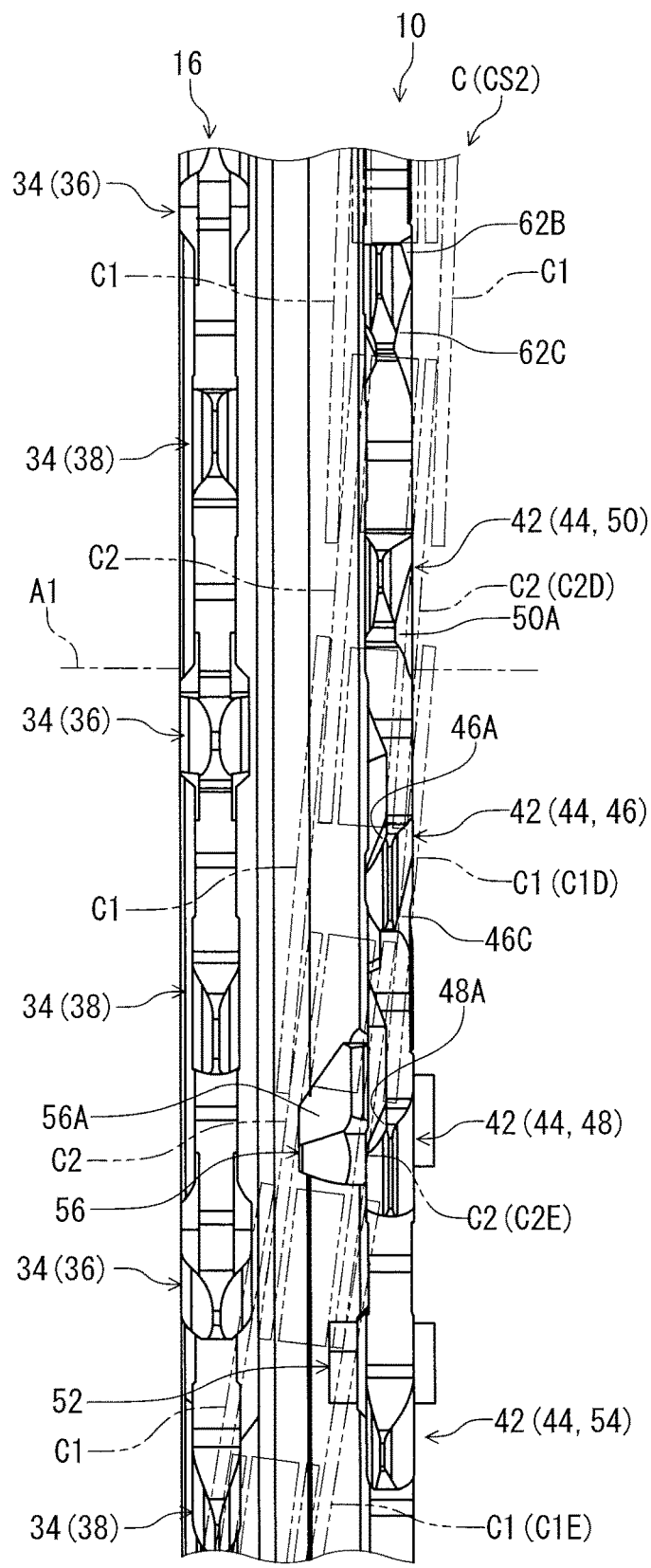
FIG. 23 is a plan view of the bicycle sprocket assembly illustrated in FIG. 3 with the bicycle chain (second shifting operation).

As seen in FIG. 23, the bicycle chain C is shifted from the second sprocket 18 toward the first sprocket 16 by the front derailleur (not shown) in the second shifting operation (in the second chain-phase state CS2). The second reverse upstream chamfer 50A facilitates an inclination of the inner link plate C2D toward the first sprocket 16 relative to the axial direction D2. The first reverse upstream chamfer 46C facilitates an inclination of the outer link plates C1D toward the first sprocket 16 relative to the axial direction D2. Furthermore, the second downstream chamfer 48A guides the inner link plate C2E toward the first sprocket 16 in the axial direction D2. Thus, the bicycle chain C is first derailed from the second sprocket 18 at the second derailing tooth 48 in the second shifting operation.

Figure 24:
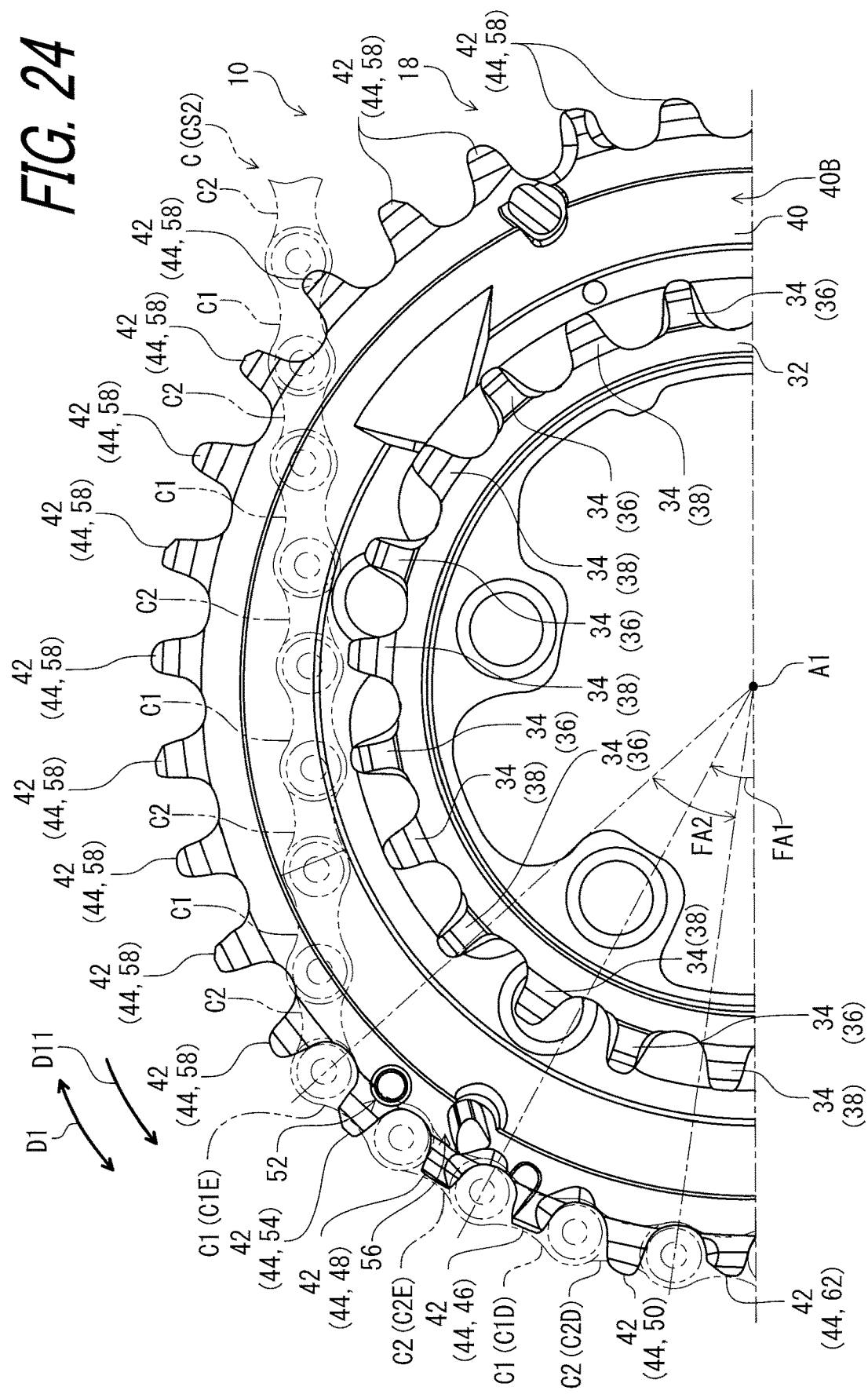
FIG. 24 is a partial side elevational view of the bicycle sprocket assembly illustrated in FIG. 3 with the bicycle chain (second shifting operation).

In the second shifting operation, the inner link plate C2E is not guided by the guide surface 56A of the bump portion 56 toward the first sprocket 16 since the inner link plate C2E is adjacent to or in contact with the second derailing tooth 48. This brings the outer link plate C1E into contact with the shifting facilitation projection 52. Thus, as seen in FIG. 24, the outer link plate C1E is supported by the shifting facilitation projection 52. The bicycle chain C extends from the shifting facilitation projection 52 on a route different from the route of the bicycle chain C of the first shifting operation when viewed from the axial direction D2. This easily brings the bicycle chain C into engagement with the first sprocket teeth 34 when the bicycle chain C is in the second chain-phase state CS2. Accordingly, the second shifting facilitation area FA2 facilitates the second shifting operation in which the bicycle chain C is shifted from the second sprocket 18 toward the first sprocket 16 in the second chain-phase state CS2.

Figure 25:
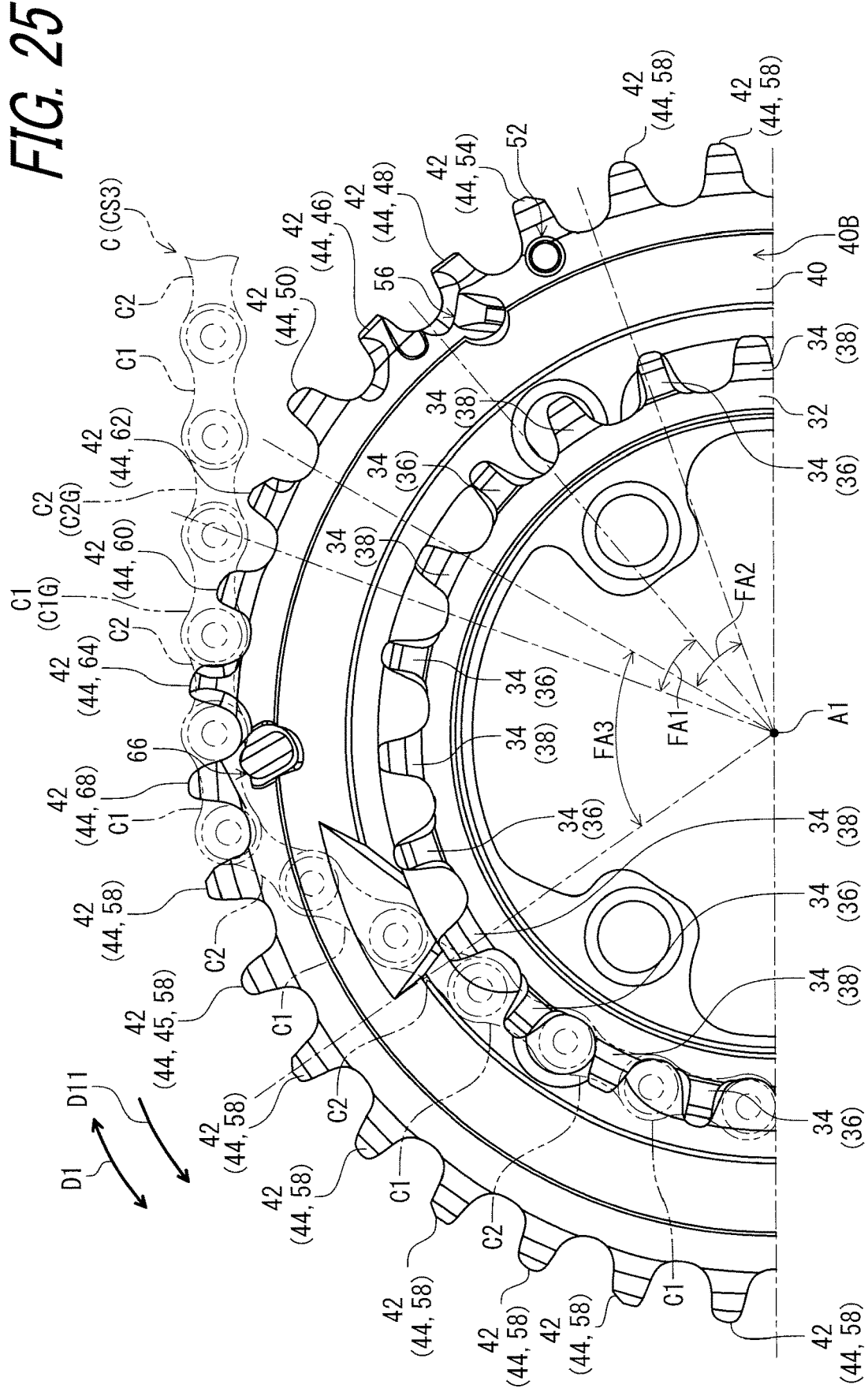
FIG. 25 is a partial side elevational view of the bicycle sprocket assembly illustrated in FIG. 3 with the bicycle chain (third shifting operation).

As seen in FIG. 25, the bicycle chain C is lifted by the additional shifting facilitation projection 66 in the third shifting operation when the bicycle chain C is shifted from the first sprocket 16 toward the second sprocket 18 by the front derailleur (not shown). This brings the outer link plates C1G into engagement with the outer-link receiving tooth 60 and brings the inner link plates C2G into engagement with the inner-link receiving tooth 62. The outer-link receiving tooth 60 first receives the bicycle chain C in the third shifting operation. Thus, the third shifting facilitation area FA3 facilitates the third shifting operation in which the bicycle chain C is shifted from the first sprocket 16 to the second sprocket 18. The bicycle chain C is in the first chain-phase state CS1 (FIG. 10) after completion of the third shifting operation. In this embodiment, the bicycle chain C is necessarily in the first chain-phase state CS1 (FIG. 10) after completion of the third shifting operation since the first sprocket 16 has only the third chain-phase state CS3. The bicycle chain C is in the second chain-phase state CS2 when the user brings the bicycle chain C into engagement with the second sprocket 18 to be in the second chain-phase state CS2 instead of the first chain-phase state CS1. The first chain-phase state CS1 can also be referred to as a regular chain-phase state CS1, and the second chain-phase state CS2 can also be referred to as an irregular chain-phase state CS2.

With the bicycle crank assembly 10, it is possible to smoothly shift the bicycle chain C between the first sprocket 16 and the second sprocket 18 in each of the first chain-phase state CS1 and the second chain-phase state CS2 (i.e. the irregular chain-phase state CS2) different from the first chain-phase state CS1 (i.e. the regular chain-phase state CS1).

Second Embodiment

A bicycle crank assembly 210 including a first sprocket 216 in accordance with a second embodiment will be described below referring to FIGS. 26 and 27. The first sprocket 216 has the same structure as that of the first sprocket 16 except for the plurality of first teeth 36. Thus, elements having substantially the same function as those in the first embodiment will be numbered the same here, and will not be described again in detail here for the sake of brevity.

Figure 26:
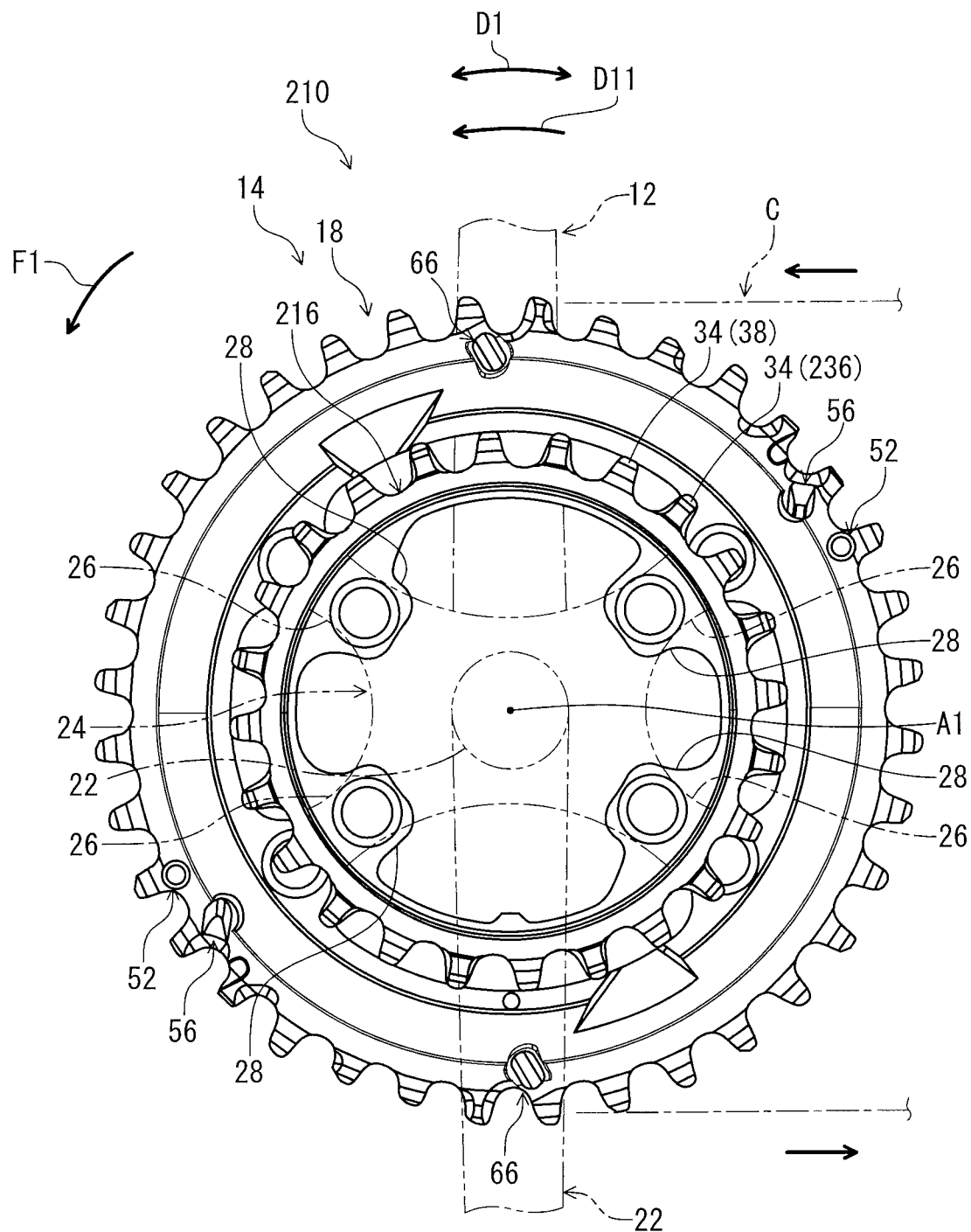
FIG. 26 is a side elevational view of a bicycle crank assembly in accordance with a second embodiment.
Figure 27:
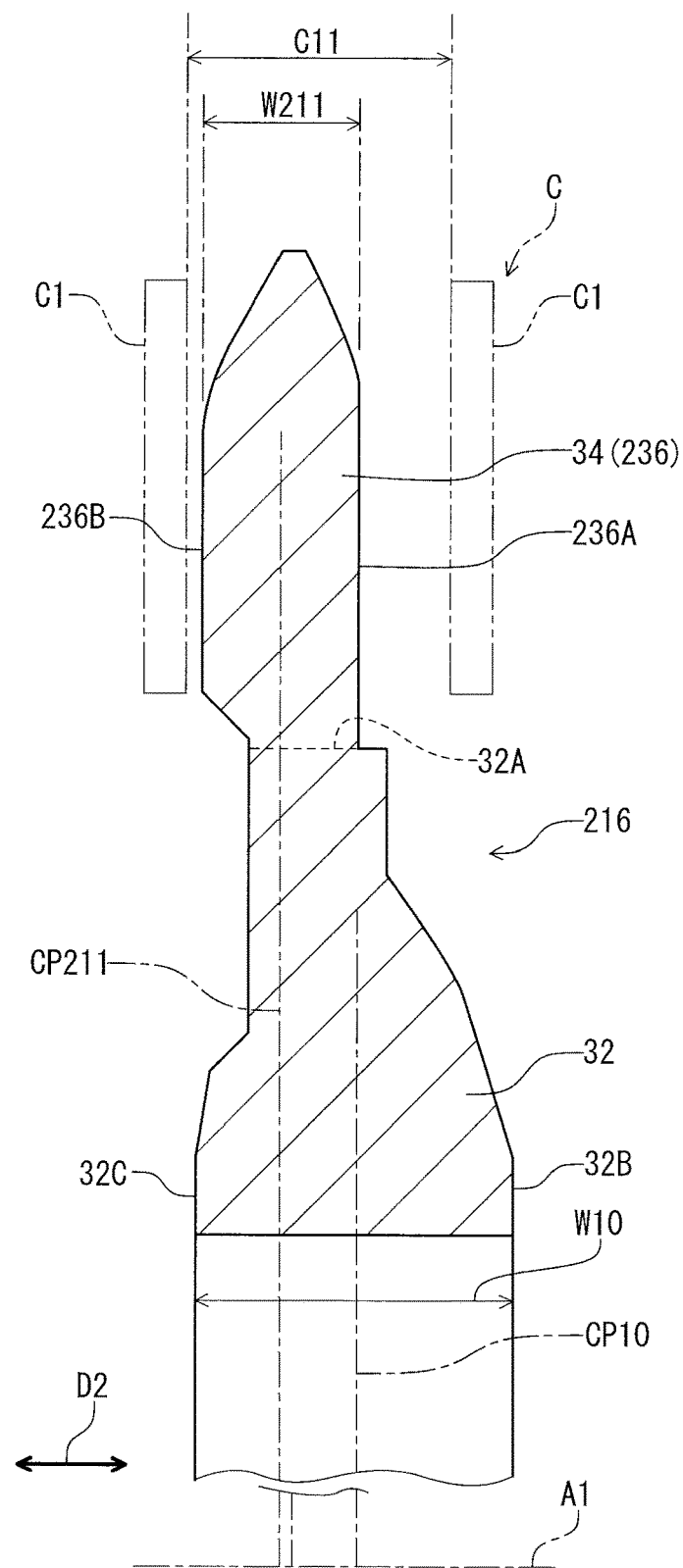
FIG. 27 is a cross-sectional view of a first sprocket of the bicycle crank assembly illustrated in FIG. 26.

As seen in FIGS. 26 and 27, in the first sprocket 216, the plurality of first sprocket teeth 34 includes at least one first tooth 236 provided on the first outer periphery 32A to be received in only the outer link space C11. The at least one first tooth 236 includes a plurality of first teeth 236. As seen in FIG. 27, the at least one first tooth 236 has a first maximum width W211 and a first tooth center plane CP211. The first maximum width W211 is defined in the axial direction D2 parallel to the rotational center axis A1. The first tooth center plane CP211 is defined to bisect the first maximum width W211 in the axial direction D2 and is offset from the first reference center plane CP10 in the axial direction D2.

In this embodiment, the first tooth 236 includes a chain-engagement surface 236A and a reverse surface 236B. The chain-engagement surface 236A faces in the axial direction D2 and is contactable with one of the pair of outer link plates C1. The reverse surface 236B faces in the axial direction D2 and is provided on a reverse side of the chain-engagement surface 236A in the axial direction D2. The first maximum width W211 is defined between the chain-engagement surface 236A and the reverse surface 236B in the axial direction D2. The first maximum width W211 is smaller than the first body maximum width W10. The first maximum width W211 is smaller than the first maximum width W11 of the first tooth 36 of the first embodiment. The first maximum width W211 is substantially equal to the first additional maximum width W12 of the first additional tooth 38 of the second embodiment.

As seen in FIG. 27, the first tooth 236 has a first tooth center plane CP211 defined to bisect the first chain engaging width W211 in the axial direction D2. The first tooth center plane CP211 is perpendicular to the rotational center axis A1. The first tooth center plane CP211 is offset from the first reference center plane CP10 in the axial direction D2. However, the first tooth center plane CP211 can coincide with the first reference center plane CP10 in the axial direction D2.

With the bicycle crank assembly 210, it is possible to obtain substantially the same effect as that of the bicycle crank assembly 10 of the first embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle crank assembly comprising:
a crank arm;
a first sprocket coupled to the crank arm to integrally rotate with the crank arm about a rotational center axis, the first sprocket comprising:
a first sprocket body including a first outer periphery; and
a plurality of first sprocket teeth provided on the first outer periphery, the plurality of first sprocket teeth including at least one first tooth provided on the first outer periphery to be received in only an outer link space defined between a pair of outer link plates of a bicycle chain; and
a second sprocket coupled to the crank arm to integrally rotate with the crank arm about the rotational center axis, the second sprocket comprising:
a second sprocket body including a second outer periphery; and
a plurality of second sprocket teeth provided on the second outer periphery, the plurality of second sprocket teeth including at least one second tooth provided on the second outer periphery to be engaged with the bicycle chain,
one of the first sprocket and the second sprocket having a pitch-circle diameter larger than a pitch-circle diameter of the other of the first sprocket and the second sprocket, the one of the first sprocket and the second sprocket comprising:
a first shifting facilitation area to facilitate a first shifting operation in which the bicycle chain is shifted from the second sprocket toward the first sprocket in a first chain-phase state in which a reference tooth of the plurality of second sprocket teeth is received in the outer link space, and
a second shifting facilitation area to facilitate a second shifting operation in which the bicycle chain is shifted from the second sprocket toward the first sprocket in a second chain-phase state in which the reference tooth of the plurality of second sprocket teeth is received in an inner link space defined between a pair of inner link plates of the bicycle chain.

2. The bicycle crank assembly according to claim 1, wherein
the at least one first tooth includes a plurality of first teeth provided on the first outer periphery to be received in only the outer link space, and
the at least one second tooth includes a plurality of second teeth provided on the second outer periphery to be capable of being received in each of the outer link space and the inner link space.

3. The bicycle crank assembly according to claim 1, wherein
the plurality of first sprocket teeth includes at least one first additional tooth provided on the first outer periphery to be received in only the inner link space.

4. The bicycle crank assembly according to claim 1, wherein
the first sprocket body has a first reference center plane perpendicular to the rotational center axis, and
the at least one first tooth has
a first maximum width defined in an axial direction parallel to the rotational center axis, and
a first tooth center plane defined to bisect the first maximum width in the axial direction and offset from the first reference center plane in the axial direction.

5. The bicycle crank assembly according to claim 1, wherein
the first sprocket comprises at least one first additional tooth provided on the first outer periphery to be received in only the inner link space, and
the at least one first tooth and the at least one first additional tooth are alternatingly arranged in a circumferential direction defined about the rotational center axis.

6. The bicycle crank assembly according to claim 1, wherein
the first sprocket has a first pitch-circle diameter defined by the plurality of first sprocket teeth,
the second sprocket has a second pitch-circle diameter defined by the plurality of second sprocket teeth, and
the second pitch-circle diameter is larger than the first pitch-circle diameter.

7. The bicycle crank assembly according to claim 6, wherein
the at least one second tooth includes
a first derailing tooth provided in the first shifting facilitation area to first derail the bicycle chain from the second sprocket in the first shifting operation, and
a second derailing tooth provided in the second shifting facilitation area to first derail the bicycle chain from the second sprocket in the second shifting operation.

8. The bicycle crank assembly according to claim 7, wherein
the at least one second tooth includes at least one chain-driving tooth provided outside the first shifting facilitation area and the second shifting facilitation area, the at least one chain-driving tooth having a reference radial length defined radially outward from the second outer periphery, the first derailing tooth has a first radial length defined radially outward from the second outer periphery, the first radial length being shorter than the reference radial length, and
the second derailing tooth has a second radial length defined radially outward from the second outer periphery, the second radial length being shorter than the reference radial length.

9. The bicycle crank assembly according to claim 1, wherein
the first shifting facilitation area at least partly overlaps with the second shifting facilitation area in a circumferential direction defined about the rotational center axis.

10. The bicycle crank assembly according to claim 7, wherein
the first derailing tooth is adjacent to the second derailing tooth without another tooth between the first derailing tooth and the second derailing tooth in a circumferential direction defined about the rotational center axis.

11. The bicycle crank assembly according to claim 1, wherein
the second sprocket comprises a shifting facilitation projection provided in the second shifting facilitation area to facilitate the second shifting operation.

12. The bicycle crank assembly according to claim 11, wherein
the shifting facilitation projection is provided on an upstream side of the second derailing tooth in a driving rotational direction in which the bicycle crank assembly rotates about the rotational center axis during pedaling.

13. The bicycle crank assembly according to claim 12, wherein
the at least one second tooth includes an adjacent tooth closest to the shifting facilitation projection among the at least one second tooth, and
the second derailing tooth is adjacent to the adjacent tooth without another tooth between the second derailing tooth and the adjacent tooth in the driving rotational direction.

14. The bicycle crank assembly according to claim 11, wherein
the second sprocket comprises a bump portion provided in the second shifting facilitation area to restrict engagement of the shifting facilitation projection with the bicycle chain in the first shifting operation.

15. The bicycle crank assembly according to claim 14, wherein
the bump portion is provided on a downstream side of the shifting facilitation projection in a driving rotational direction in which the bicycle crank assembly rotates about the rotational center axis during pedaling.

16. The bicycle crank assembly according to claim 14, wherein
the bump portion includes a guide surface to guide the bicycle chain toward the first sprocket in an axial direction parallel to the rotational center axis in the second shifting operation.

17. The bicycle crank assembly according to claim 14, wherein
the shifting facilitation projection has a first amount of projection defined from the second sprocket body in an axial direction parallel to the rotational center axis,
the bump portion has a second amount of projection defined from the second sprocket body in the axial direction, and the second amount of projection is larger than the first amount of projection.

18. The bicycle crank assembly according to claim 7, wherein
the second sprocket comprises
an axial surface facing toward the first sprocket in an axial direction parallel to the rotational center axis, and
a reverse axial surface provided on a reverse side of the axial surface in the axial direction,
the first derailing tooth includes a first upstream chamfer provided on the axial surface, and
the first upstream chamfer is provided on an upstream side in the first derailing tooth in a driving rotational direction in which the bicycle crank assembly rotates about the rotational center axis during pedaling.

19. The bicycle crank assembly according to claim 7, wherein
the second sprocket comprises
an axial surface facing toward the first sprocket in an axial direction parallel to the rotational center axis, and
a reverse axial surface provided on a reverse side of the axial surface in the axial direction,
the first derailing tooth includes a first reverse upstream chamfer provided on the reverse axial surface, and
the first reverse upstream chamfer is provided on an upstream side in the first derailing tooth in a driving rotational direction in which the bicycle crank assembly rotates about the rotational center axis during pedaling.

20. The bicycle crank assembly according to claim 7, wherein
the second sprocket comprises
an axial surface facing toward the first sprocket in an axial direction parallel to the rotational center axis, and
a reverse axial surface provided on a reverse side of the axial surface in the axial direction,
the first derailing tooth includes a first downstream chamfer provided on the axial surface, and
the first downstream chamfer is provided on a downstream side in the first derailing tooth in a driving rotational direction in which the bicycle crank assembly rotates about the rotational center axis during pedaling.

21. The bicycle crank assembly according to claim 7, wherein
the second sprocket comprises
an axial surface facing toward the first sprocket in an axial direction parallel to the rotational center axis, and
a reverse axial surface provided on a reverse side of the axial surface in the axial direction,
the second derailing tooth includes a second downstream chamfer provided on the axial surface, and
the second downstream chamfer is provided on a downstream side in the second derailing tooth in a driving rotational direction in which the bicycle crank assembly rotates about the rotational center axis during pedaling.

22. The bicycle crank assembly according to claim 1, wherein
the first sprocket has a first pitch-circle diameter defined by the plurality of first sprocket teeth,
the second sprocket has a second pitch-circle diameter defined by the plurality of second sprocket teeth, and the first pitch-circle diameter is larger than the second pitch-circle diameter.

23. The bicycle crank assembly according to claim 1, wherein
all the plurality of second sprocket teeth are capable of being received in each of the outer link space and the inner link space.

24. A bicycle sprocket assembly comprising:
a first sprocket comprising:
a first sprocket body including a first outer periphery;
a plurality of first sprocket teeth provided on the first outer periphery, the plurality of first sprocket teeth including at least one first tooth provided on the first outer periphery to be received in only an outer link space defined between a pair of outer link plates of a bicycle chain; and
a first pitch-circle diameter defined by the plurality of first sprocket teeth; and
a second sprocket comprising:
a second sprocket body including a second outer periphery;
a plurality of second sprocket teeth provided on the second outer periphery, the plurality of second sprocket teeth including at least one second tooth provided on the second outer periphery to be capable of being received in each of the outer link space and an inner link space defined between a pair of inner link plates of the bicycle chain when the bicycle chain is wrapped around the second sprocket in use; and
a second pitch-circle diameter defined by the plurality of second sprocket teeth and larger than the first pitch-circle diameter, wherein
adjacent two second sprocket teeth of the plurality of second sprocket teeth are configured to be received in each of the outer link space and the inner link space.

25. The bicycle sprocket assembly according to claim 24, wherein
the at least one first tooth includes a plurality of first teeth provided on the first outer periphery to be received in only the outer link space, and
the at least one second tooth includes a plurality of second teeth provided on the second outer periphery to be capable of being received in each of the outer link space and the inner link space.

26. A bicycle sprocket assembly comprising:
a first sprocket comprising:
a first sprocket body including a first outer periphery;
a plurality of first sprocket teeth provided on the first outer periphery, the plurality of first sprocket teeth including at least one first tooth provided on the first outer periphery to be received in only an outer link space defined between a pair of outer link plates of a bicycle chain; and
a first pitch-circle diameter defined by the plurality of first sprocket teeth; and
a second sprocket comprising:
a second sprocket body including a second outer periphery;
a plurality of second sprocket teeth provided on the second outer periphery, the plurality of second sprocket teeth including at least one second tooth provided on the second outer periphery to be capable of being received in each of the outer link space and an inner link space defined between a pair of inner link plates of the bicycle chain; and a second pitch-circle diameter defined by the plurality of second sprocket teeth and larger than the first pitch-circle diameter, wherein the second sprocket comprises
- a first shifting facilitation area to facilitate a first shifting operation in which the bicycle chain is shifted from the second sprocket toward the first sprocket in a first chain-phase state in which a reference tooth of the plurality of second sprocket teeth is received in the outer link space, and
- a second shifting facilitation area to facilitate a second shifting operation in which the bicycle chain is shifted from the second sprocket toward the first sprocket in a second chain-phase state in which the reference tooth of the plurality of second sprocket teeth is received in the inner link space.

27. The bicycle sprocket assembly according to claim 24, wherein the plurality of first sprocket teeth includes at least one first additional tooth provided on the first outer periphery of the first sprocket body to be received in only the inner link space.

28. The bicycle sprocket assembly according to claim 24, wherein the first sprocket body has a first reference center plane perpendicular to the rotational center axis, and the at least one first tooth has
- a first maximum width defined in an axial direction parallel to the rotational center axis, and
- a first tooth center plane defined to bisect the first maximum width in the axial direction and offset from the first reference center plane in the axial direction.

29. The bicycle sprocket assembly according to claim 24, wherein all the plurality of second sprocket teeth are capable of being received in each of the outer link space and the inner link space.

30. A bicycle sprocket assembly comprising:

a first sprocket comprising:
- a first sprocket body including a first outer periphery;
- a plurality of first sprocket teeth provided on the first outer periphery, the plurality of first sprocket teeth including at least one first tooth provided on the first outer periphery to be received in only an outer link space defined between a pair of outer link plates of a bicycle chain; and
- a first pitch-circle diameter defined by the plurality of first sprocket teeth; and a second sprocket comprising:
- a second sprocket body including a second outer periphery;
- a plurality of second sprocket teeth provided on the second outer periphery, the plurality of second sprocket teeth including at least one second tooth provided on the second outer periphery to be capable of being received in each of the outer link space and an inner link space defined between a pair of inner link plates of the bicycle chain; and
- a second pitch-circle diameter defined by the plurality of second sprocket teeth and larger than the first pitch-circle diameter, wherein adjacent two second sprocket teeth of the plurality of second sprocket teeth are configured to be received in each of the outer link space and the inner link space.

* * * * *